United States Patent
Akamatsu

(10) Patent No.: US 7,489,328 B2
(45) Date of Patent: Feb. 10, 2009

(54) IMAGE CORRECTION IN AN IMAGE FORMING APPARATUS AND IMAGE FORMING METHOD

(75) Inventor: Hidenori Akamatsu, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 125 days.

(21) Appl. No.: 11/443,063

(22) Filed: May 31, 2006

(65) Prior Publication Data

US 2007/0139746 A1 Jun. 21, 2007

(30) Foreign Application Priority Data

May 31, 2005 (JP) ............................. 2005-160307
May 22, 2006 (JP) ............................. 2006-141971

(51) Int. Cl.
*B41J 2/435* (2006.01)
*B41J 2/47* (2006.01)

(52) U.S. Cl. ...................................... 347/235; 347/250

(58) Field of Classification Search .................. 347/19, 347/116, 234–237, 241, 248–250, 232; 382/167
See application file for complete search history.

(56) References Cited

U.S. PATENT DOCUMENTS 7,055,928 B2 * 6/2006 Ishibashi et al. .............. 347/19
7,133,056 B2 * 11/2006 Tanaka et al. ................ 347/116
7,218,337 B2 * 5/2007 Yokoyama ................... 347/241
2001/0028387 A1 * 10/2001 Maeda ......................... 347/232
2003/0142865 A1 * 7/2003 Hirota et al. ................. 382/167
2005/0206744 A1 9/2005 Ohkawara et al.
2005/0275713 A1 * 12/2005 Kawai .......................... 347/250
2006/0055902 A1 3/2006 Ohkawara et al.

FOREIGN PATENT DOCUMENTS

JP 2001-180043 7/2001
JP 2003-185953 7/2003

* cited by examiner

*Primary Examiner*—Hai C Pham
(74) *Attorney, Agent, or Firm*—Oblon, Spivak, McClelland, Maier & Neustadt, P.C.

(57) ABSTRACT

A magnification correction controller corrects magnification in a main scanning direction by changing a timing of an image signal based on a time difference between a first detection time in a predetermined position along a main scanning line of the image carrier to which the laser beam is irradiated and a second detection time in a position different from the predetermined position along the main scanning line. The magnification correction controller corrects the magnification in the main scanning direction by changing a timing of the image signal corresponding to a color different from a predetermined color, based on the time difference measured for the predetermined color.

20 Claims, 27 Drawing Sheets

DIRECTION OF ROTATION OF INTERMEDIATE TRANSFER BELT

DIRECTION OF CONVEYANCE OF RECORDING PAPER

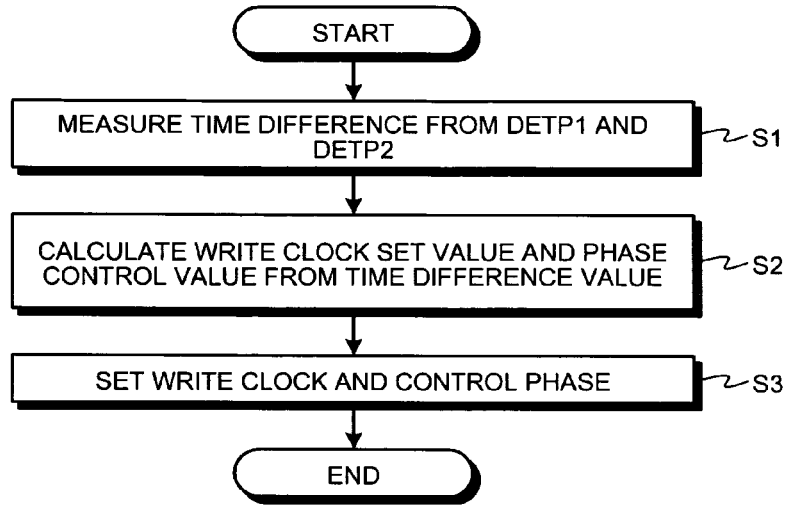
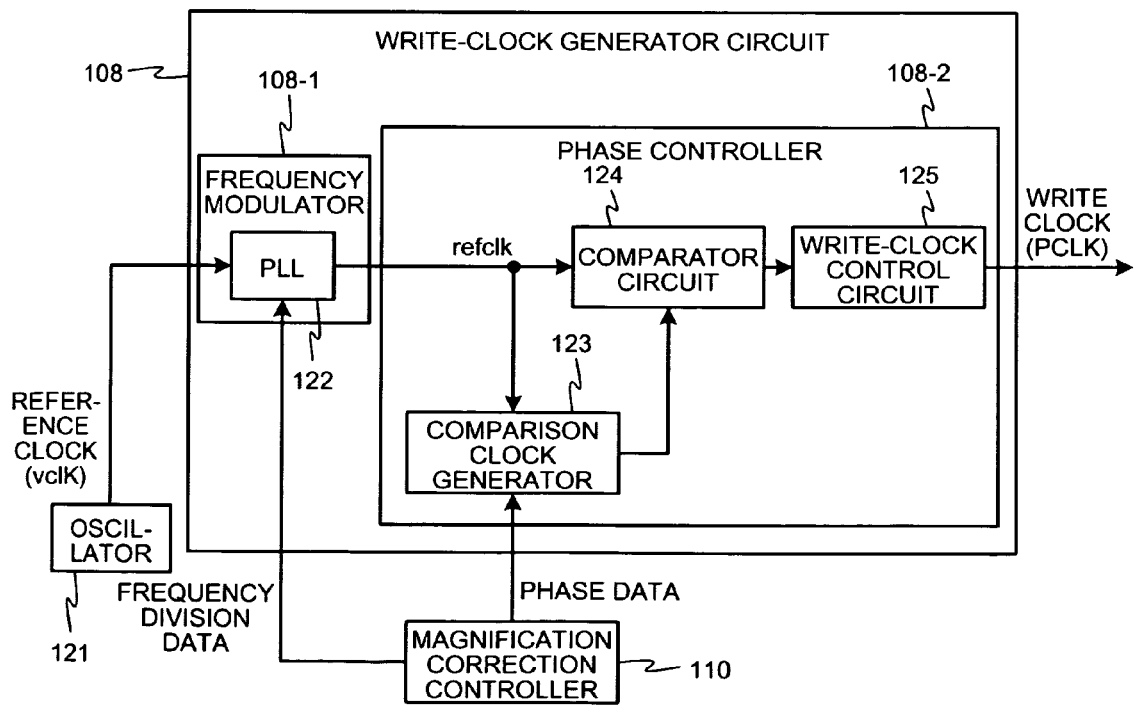

IMAGE CORRECTION IN AN IMAGE FORMING APPARATUS AND IMAGE FORMING METHOD

CROSS-REFERENCE TO RELATED APPLICATIONS

The present document incorporates by reference the entire contents of Japanese priority document, 2005-160307 filed in Japan on May 31, 2005 and 2006-141971 filed in Japan on May 22, 2006.

BACKGROUND OF THE INVENTION

1. Field of the Invention

The present invention relates to a technology for correcting a position of a pixel formed on an image carrier by a laser beam in a main scanning direction.

2. Description of the Related Art

An image forming apparatus such as a laser printer, a laser facsimile, and a digital copier includes an optical writing device or an optical scanning device that has an optical deflector (polygon mirror) which deflects and reflects a light flux modulated according to an image signal, and has an image carrier to which an image is written by scanning the light flux deflected by the optical deflector. As a unit for generating the light flux, a laser light source such as a semiconductor laser is generally used. A color image forming apparatus that forms a color image is configured to modulate laser beams by image signals for colors of, for example, yellow (Y), cyan (C), black (K), and magenta (M), respectively, and form images for Y, C, K, and M on four respective scanned surfaces. These color images are transferred to a transferred unit such as a recording paper in a superimposed manner, to form a color image.

In this image forming apparatus, when a plastic lens is particularly used as an fθ lens for converting a laser beam deflected at an equiangular velocity by the optical deflector to that at a constant linear velocity, a linear expansion coefficient of plastic is comparatively large. Therefore, displacement of a beam spot cannot be negligible. More specifically, the displacement occurs caused by changes in shape and reflection coefficient of the plastic lens due to a change in environment temperature and a change in temperature in the apparatus. Furthermore, there may be a case where the reflection coefficient is changed in each beam due to changes or variations in wavelengths of laser beams and displacement in a beam spot cannot thereby be neglected. In this case, a scanned position on the image surface of the image carrier is changed, and this causes a magnification error in the main scanning direction to occur and a high-quality image not to be obtained.

To resolve the problems, Japanese Patent Application Laid-Open No. 2003-185953 discloses an image forming apparatus as follows. In the image forming apparatus, a laser beam is detected by laser beam detectors provided in a leading edge side of the laser beam (scanning start side) and a trailing edge side thereof (scanning end side) outside an effective writing area in the main scanning direction. Then, a time from detection of the laser beam by the laser beam detector in the leading edge side to detection thereof by the laser beam detector in the trailing edge side is measured, and frequency and phase of a clock for writing a pixel forming an image signal are changed according to the result of measurement, and a scanning magnification of each laser beam is corrected, to thereby correct a magnification error and a color shift in an image occurring due to the change in environment temperature and the change in temperature in the apparatus.

FIG. 30 is a diagram of a laser-beam scanning device in the image forming apparatus. This laser-beam scanning device includes laser diodes (LDs) 109Y, 109C, 109K, and 109M for colors of Y, C, K, and M, respectively; and LD driver boards 112Y, 112C, 112K, and 112M for turning on the LDs 109Y, 109C, 109K, and 109M in synchronization with the respective image signals for Y, C, K, and M. This scanning device also includes collimate lenses 113Y, 113C, 113K, and 113M for changing the laser beams emitted from the LDs 109Y, 109C, 109K, and 109M to parallel pencils, respectively; and mirrors 114C and 114K for reflecting the laser beams having been changed to the parallel pencils by the collimate lenses 113C and 113K and changing each direction of the laser beams. This scanning device further includes a polygon mirror 102 for deflecting, at an equiangular velocity, the laser beams passing through the collimate lenses 113Y and 113M and the laser beams reflected by the mirrors 114C and 114K; an fθ lens 103-1 for performing equiangular velocity/constant linear velocity conversion on the laser beams of Y and C deflected by the polygon mirror 102; and an fθ lens 103-2 for performing equiangular velocity/constant linear velocity conversion on the laser beams of K and M deflected thereby. This scanning device further includes photosensitive elements (image carriers) 104Y, 104C, 104K, and 104M for Y, C, K, and M, respectively; return mirrors 115Y, 115C, 115K, and 115M for reflecting the laser beams having passed through the fθ lenses 103-1 and 103-2 to the directions of the photosensitive elements 104Y, 104C, 104K, and 104M, respectively; and optical sensors 105Y, 105C, 105K, 105M, 106Y, 106C, 106K, and 106M which are laser beam detectors for detecting leading edges and trailing edges, in the main scanning direction, of the laser beams reflected by the return mirrors 115Y, 115C, 115K, and 115M, respectively. Each of these optical sensors is formed with a photo integrated circuit (IC) integrated with a photodiode, a phototransistor, or these peripheral circuits.

FIG. 31 is block diagram of an electrical configuration of the laser-beam scanning device of FIG. 30. The optical sensors 105Y, 105C, 105M, and 105K and the optical sensors 106Y, 106C, 106M, and 106K detect each leading edge and each trailing edge of the laser beams for Y, C, M, and K, respectively, by scanning the laser beams, and generate laser-beam leading-edge detection signals (hereinafter, "leading-edge detection signals") DETP1Y, DETP1C, DETP1M, and DETP1K, and also generate laser-beam trailing-edge detection signals (hereinafter, "trailing-edge detection signals") DETP2Y, DETP2C, DETP2M, and DETP2K, respectively. These laser-beam detection signals are sent to time-difference measuring units 107Y, 107C, 107M, and 107K, respectively. The time-difference measuring units 107Y, 107C, 107M, and 107K have calculation functions of measuring and averaging time differences between the leading-edge detection signals and the trailing-edge detection signals, respectively. More specifically, the leading-edge detection signals DETP1Y, DETP1C, DETP1M, and DETP1K are sent from the optical sensors 105Y, 105C, 105M, and 105K respectively, and the trailing-edge detection signals DETP2Y, DETP2C, DETP2M, and DETP2K are sent from the optical sensors 106Y, 106C, 106M, and 106K, respectively. The time-difference measuring units 107Y, 107C, 107M, and 107K perform the measurement and calculation according to a setting timing signal from a control unit (central processing unit (CPU)), which is not shown, and send the results of the measurement and calculation to magnification correction controllers 110Y, 110C, 110M, and 110K, respectively.

Each of the magnification correction controllers 110Y, 110C, 110M, and 110K includes a storage unit that stores a set write clock frequency and an initial set value and/or a current set value of a phase control value sent from the control unit (CPU). Each of the magnification correction controllers 110Y, 110C, 110M, and 110K also includes a function of calculating optimal write clock frequency and phase control value according to each of the results of the measurement and calculation in the time-difference measuring units 107Y, 107C, 107M, and 107K. More specifically, the calculation is performed by using a change in image magnification in the main scanning direction due to a change in frequency of the write clock, and by using a change in image magnification in the main scanning direction due to a change in phase of the write clock by a unit smaller than a unit of adjustment (one main scanning) by which a frequency of the write clock is adjusted. Each of the magnification correction controllers 110Y, 110C, 110M, and 110K further includes a function of fixing a write clock frequency and calculating an optimal phase control value according to the results of the measurement and calculation in the time-difference measuring units 107Y, 107C, 107M, and 107K, includes a function of comparing the phase control value with a reference value set in the control unit (CPU), and sends a control signal indicating setting of a write clock and implementation of phase control based on the setting in the control unit (CPU), to each of write-clock generator circuits 108Y, 108C, 108M, and 108K.

The write-clock generator circuits 108Y, 108C, 108M, and 108K include frequency modulators and phase controllers, respectively. Each of the frequency modulators generates a phase-locked loop (PLL) oscillation clock having a frequency n-times of that of write clocks PCLKY, PCLKC, PCLKM, and PCLKK for writing image signals for Y, C, M, and K, in response to reception of clocks from an oscillator (not shown). Each of the phase controllers includes a function of dividing the PLL oscillation clock by n in synchronization with each of the leading-edge detection signals DETP1Y, DETP1C, DETP1M, and DETP1K which are synchronization detection signals, and generating each of the write clocks PCLKY, PCLKC, PCLKM, and PCLKK in synchronization with each of the leading-edge detection signals DETP1Y, DETP1C, DETP1M, and DETP1K. Each of the phase controllers also includes a function of shifting a write clock period pixel by pixel by adding or subtracting an integral multiple of a half period of the PLL oscillation clock to or from each specific period of the write clocks PCLKY, PCLKC, PCLKM, and PCLKK. The write-clock generator circuits 108Y, 108C, 108M, and 108K generate the write clocks PCLKY, PCLKC, PCLKM, and PCLKK and perform phase control under control by the magnification correction controllers 110Y, 110C, 110M, and 110K, respectively.

Each of the write clocks PCLKY, PCLKC, PCLKM, and PCLKK is subjected to image magnification correction in the main scanning direction by changing frequency and phase in the respective write-clock generator circuits 108Y, 108C, 108M, and 108K, and is sent to respective LD modulators 101Y, 101C, 101M, and 101K, which are light-beam generator drivers. The LD modulators 101Y, 101C, 101M, and 101K control turning on of the LDs 109Y, 109C, 109M, and 109K according to image signals in synchronization with the write clocks PCLKY, PCLKC, PCLKM, and PCLKK from the write-clock generator circuits 108Y, 108C, 108M, and 108K, respectively. Therefore, laser beams modulated according to the image signals are emitted from the LDs 109Y, 109C, 109M, and 109K, and the laser beams emitted are deflected by the polygon mirror 102 and pass through an fθ lens 103, to scan the photosensitive elements 104Y, 104C, 104M, and 104K, respectively.

In the conventional image forming apparatus, however, to resolve nonuniform heat affecting an optical system that includes LDs, lenses, mirrors, and a housing (hereinafter, "optical system"), a time-difference measuring unit that controls magnification correction is provided in all the stages for Y, C, M, and K. This causes the number of components to increase. Furthermore, there may be a case where a time-difference measuring unit cannot acquire accurate time difference data because of failure in any of corresponding optical sensors that detects the leading edge or the trailing edge of a laser beam scanning across an image carrier (photosensitive element) for a certain color. In this case, the time difference data cannot be obtained from the relevant time-difference measuring unit until the optical sensor is replaced, and hence, magnification correction for the certain color cannot be performed.

SUMMARY OF THE INVENTION

It is an object of the present invention to at least partially solve the problems in the conventional technology.

An image forming apparatus according to one aspect of the present invention includes a laser-beam scanning unit that deflects a plurality of laser beams modulated by image signals corresponding to a plurality of different colors in a main scanning direction, and irradiates the laser beams to a plurality of image carriers corresponding to the different colors, respectively; a plurality of developing units that visualizes latent images formed on the image carriers by irradiation of the laser beams, respectively; a transfer unit that transfers the visualized latent images to a transfer element; a first laser beam detector that detects a first detection time in a predetermined position along a main scanning line of the image carrier to which the laser beam is irradiated; a second laser beam detector that detects a second detection time in a position different from the predetermined position along the main scanning line; a time-difference measuring unit that measures a time difference between the first detection time and the second detection time; and a magnification correction controller that corrects magnification in the main scanning direction by changing a timing of the image signal based on the measured time difference. The first laser beam detector and the second laser beam detector are provided near the image carrier corresponding to a predetermined color. The magnification correction controller corrects the magnification in the main scanning direction by changing a timing of the image signal corresponding to a color different from the predetermined color, based on the time difference measured for the predetermined color.

An image forming method according to another aspect of the present invention includes deflecting a plurality of laser beams modulated by image signals corresponding to a plurality of different colors in a main scanning direction; irradiating the laser beams to a plurality of image carriers corresponding to the different colors, respectively; visualizing latent images formed on the image carriers by irradiation of the laser beams; transferring the visualized latent images to a transfer element; detecting a first detection time in a predetermined position along a main scanning line of the image carrier to which the laser beam is irradiated; detecting a second detection time in a position different from the predetermined position along the main scanning line; measuring a time difference between the first detection time and the second detection time; and correcting magnification in the main scanning direction by changing a timing of the image signal based on the measured time difference. The correcting includes correcting the magnification in the main scanning direction by changing the timing of the image signal corresponding to a color different from a predetermined color, based on the time difference measured for the predetermined color.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a flowchart of an operation of magnification correction of the writing unit in FIG. 1;

FIG. 4 is a block diagram of a write-clock generator circuit in FIG. 2;

DETAILED DESCRIPTION OF THE PREFERRED EMBODIMENTS

Figure 7:
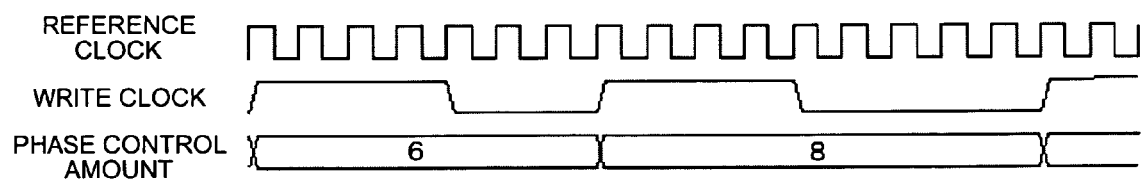
FIG. 7 is a timing chart of an operation when the write-clock control circuit of FIG. 5 changes the phase of a write clock PCLK for each clock.
Figure 8:
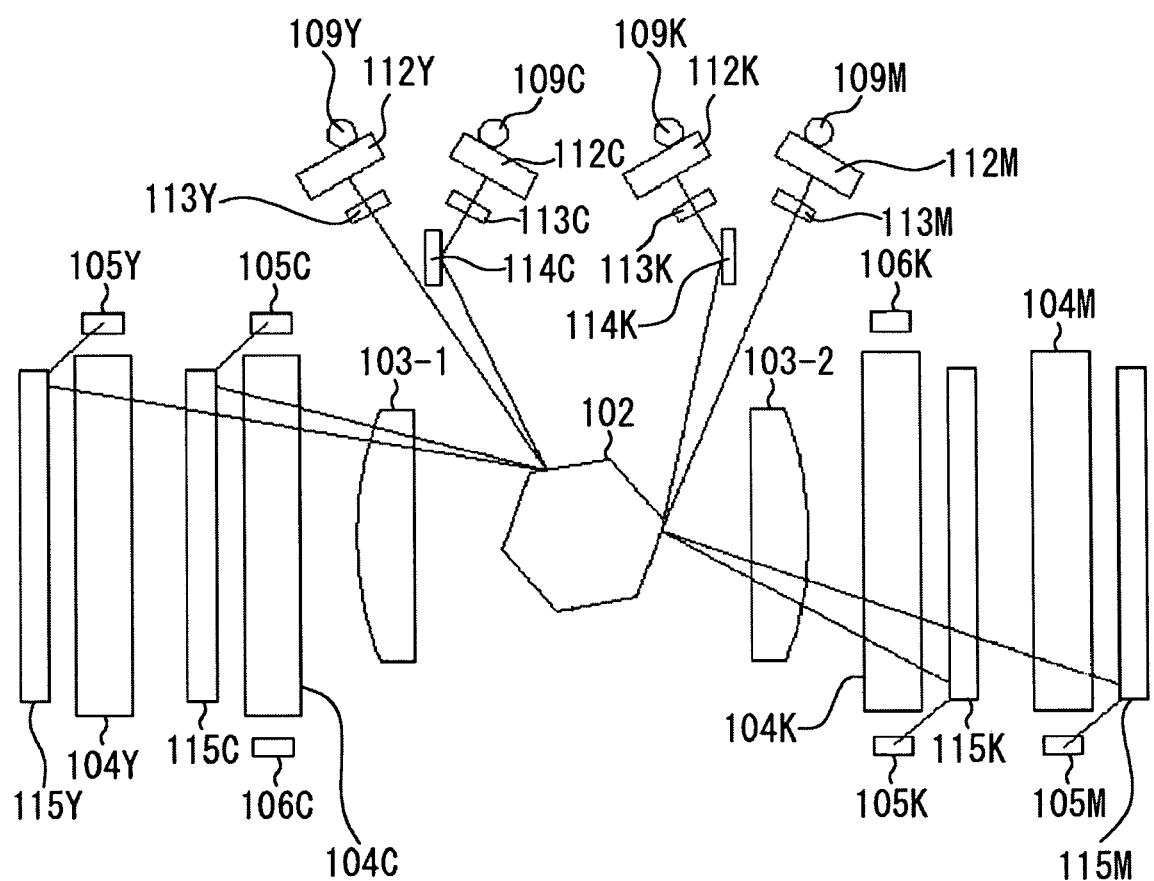
FIG. 8 is a diagram of the writing unit of FIG. 1 for four colors.
Figure 9:
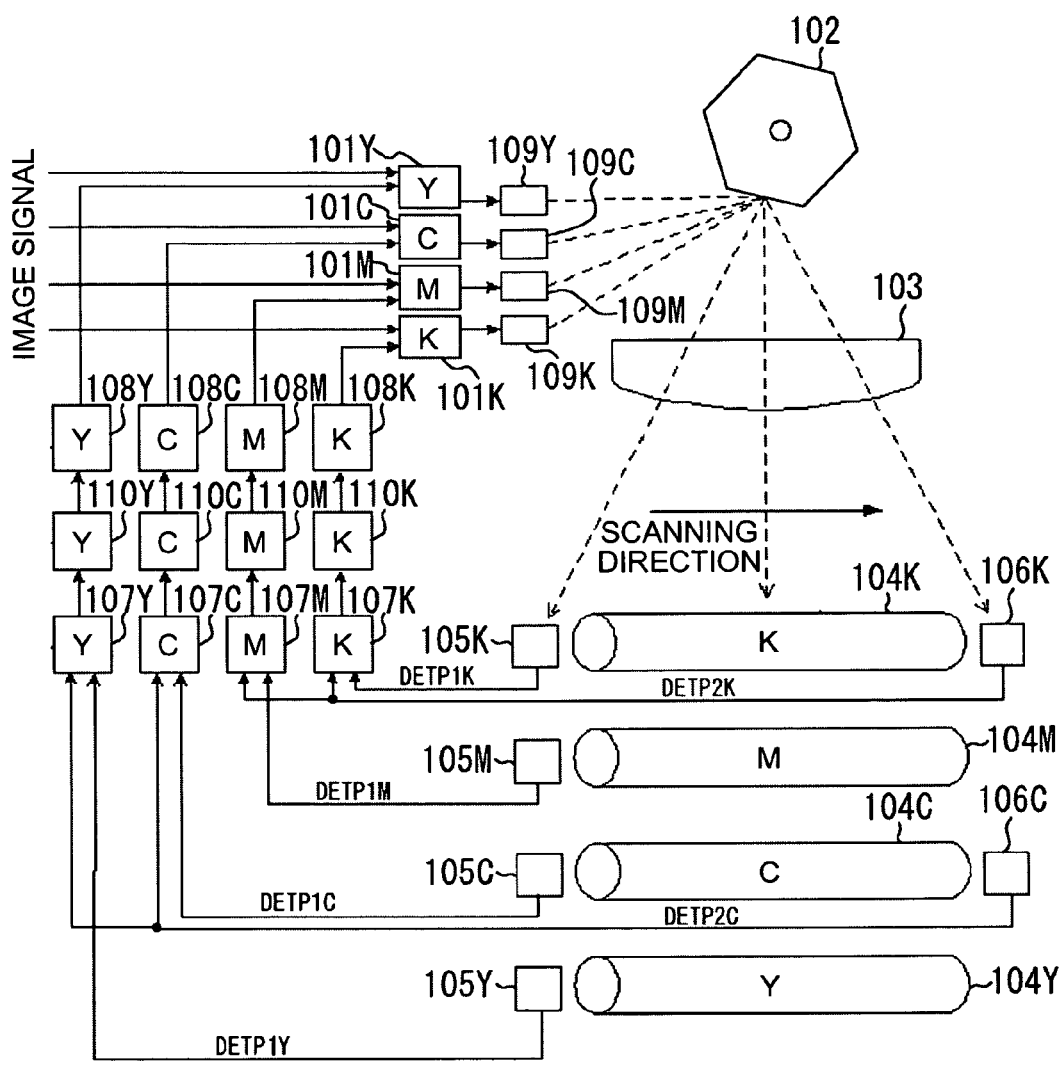
FIG. 9 is a diagram of an electrical configuration of the writing unit of FIG. 8.

Exemplary embodiments of the present invention are explained in detail below with reference to the accompanying drawings. An image forming apparatus according to a first embodiment of the present invention is explained below in the following order: A: Schematic configuration of the image forming apparatus (FIG. 1), B: Overviews of the electrical configuration of a laser-beam scanning device and the operation of magnification correction (FIG. 2 and FIG. 3), C: Configuration and operation of a write-clock generator circuit (FIG. 4 to FIG. 7), and D: Configuration and operation of the laser-beam scanning device (FIG. 8 and FIG. 9).

Figure 1:
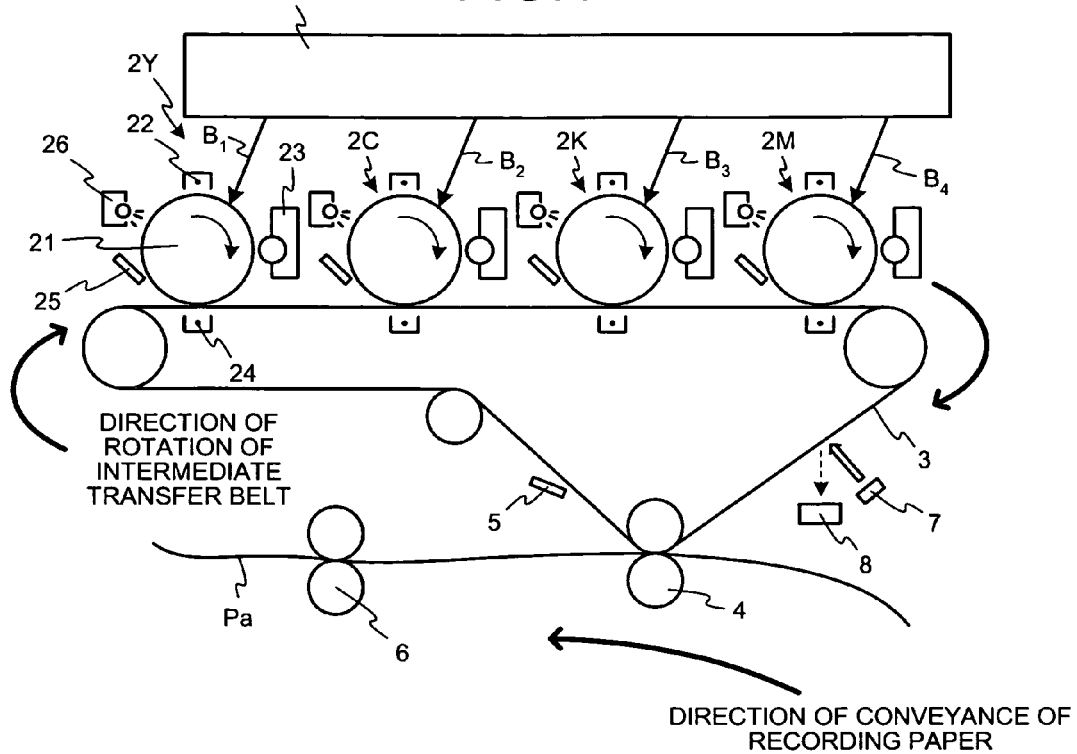
FIG. 1 is a schematic diagram of an image forming apparatus according to a first embodiment of the present invention.

FIG. 1 is a schematic diagram of the image forming apparatus according to the first embodiment. The image forming apparatus is a tandem-type full color machine, which includes a writing unit 1; intermediate imaging units 2Y, 2C, 2K, and 2M which are radiated with four laser beams B1 to B4 from the writing unit 1, to form images for the four colors of Y, C, K, and M thereon, respectively; an intermediate transfer belt 3 on which the images for Y, C, K, and M are superimposed on each other to form a full color image thereon; a secondary transfer device 4 for transferring the full color image on the intermediate transfer belt 3 to a recording paper Pa; a cleaning device 5 for cleaning the intermediate transfer belt 3 after secondary transfer is performed; and a fixing device 6 for fixing the full color image on the recording paper Pa. The intermediate imaging units 2Y, 2C, 2K, and 2M are arranged along a direction of conveyance of the intermediate transfer belt 3 so that the images for Y, C, K, and M are sequentially superimposed on each other on the intermediate transfer belt 3. A light source 7 and a light receiving sensor 8 are arranged in locations along the intermediate transfer belt 3 provided between the intermediate imaging units 2Y, 2C, 2K, and 2M and the secondary transfer device 4, and are used for reading the intensity of the full color image on the intermediate transfer belt 3.

The writing unit 1 includes an LD as a light source that emits a laser beam. An LD array, a vertical-cavity surface-emitting laser (VCSEL), a light emitting diode (LED), and electroluminescence (EL) can be also used instead of the LD. Each of the intermediate imaging units 2Y, 2C, 2K, and 2M includes a photosensitive element (drum or belt) 21 as an image carrier, a charging device 22 that charges the photosensitive element 21, a developing device 23 that visualizes a latent image written by a laser beam from the writing unit 1, a primary transfer device 24 for transferring a visualized image developed by the developing device 23 to the intermediate transfer belt 3, a cleaning device 25 for cleaning the visualized image remaining on the photosensitive element, and a decharging device 26 for decharging the photosensitive element.

As shown in FIG. 1, when an imaging operation is to be performed, the intermediate imaging units 2Y, 2C, 2K, and 2M and the intermediate transfer belt 3 are made to rotate in a clockwise direction, and the recording paper Pa is conveyed from the right to left. At first, the laser beam B1 is radiated from the writing unit 1 to the intermediate imaging unit 2Y, an image for Y is developed, and this image is transferred to the intermediate transfer belt 3. Then, the laser beam B2 is radiated from the writing unit 1 to the intermediate imaging unit 2C, an image for C is developed, and this image is transferred to the intermediate transfer belt 3 so as to be superimposed on the image for Y. Likewise, an image for K and an image for M are transferred to the intermediate transfer belt 3 so as to be sequentially superimposed on the images in the above manner, and a full color image is transferred on the intermediate transfer belt 3 in the above manner. This full color image is transferred to the recording paper Pa by the secondary transfer device 4, and fixed by the fixing device 6, to thereby form the full color image on the recording paper Pa. During this operation, transfer intensity in the secondary transfer device 4 is controlled according to the intensity of the full color image on the intermediate transfer belt 3 read by the light receiving sensor 8.

Figure 2:
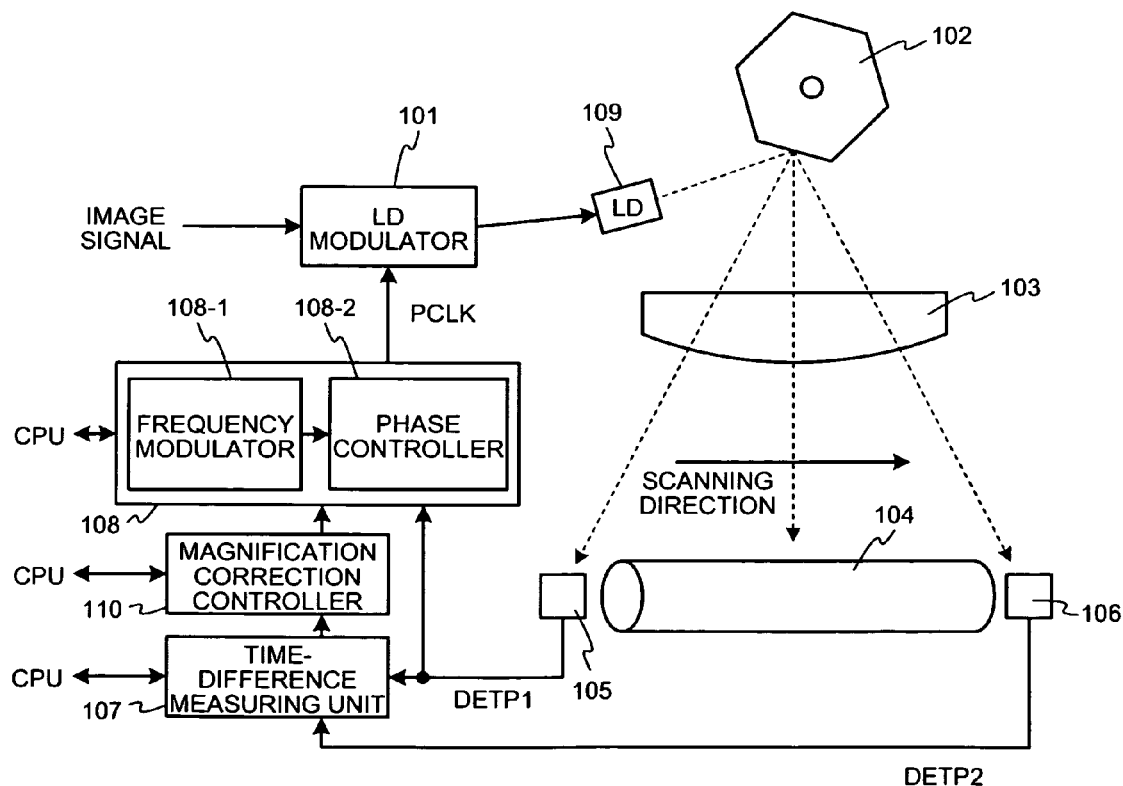
FIG. 2 is a diagram of an electrical configuration of a writing unit in FIG. 1.
Figure 31:
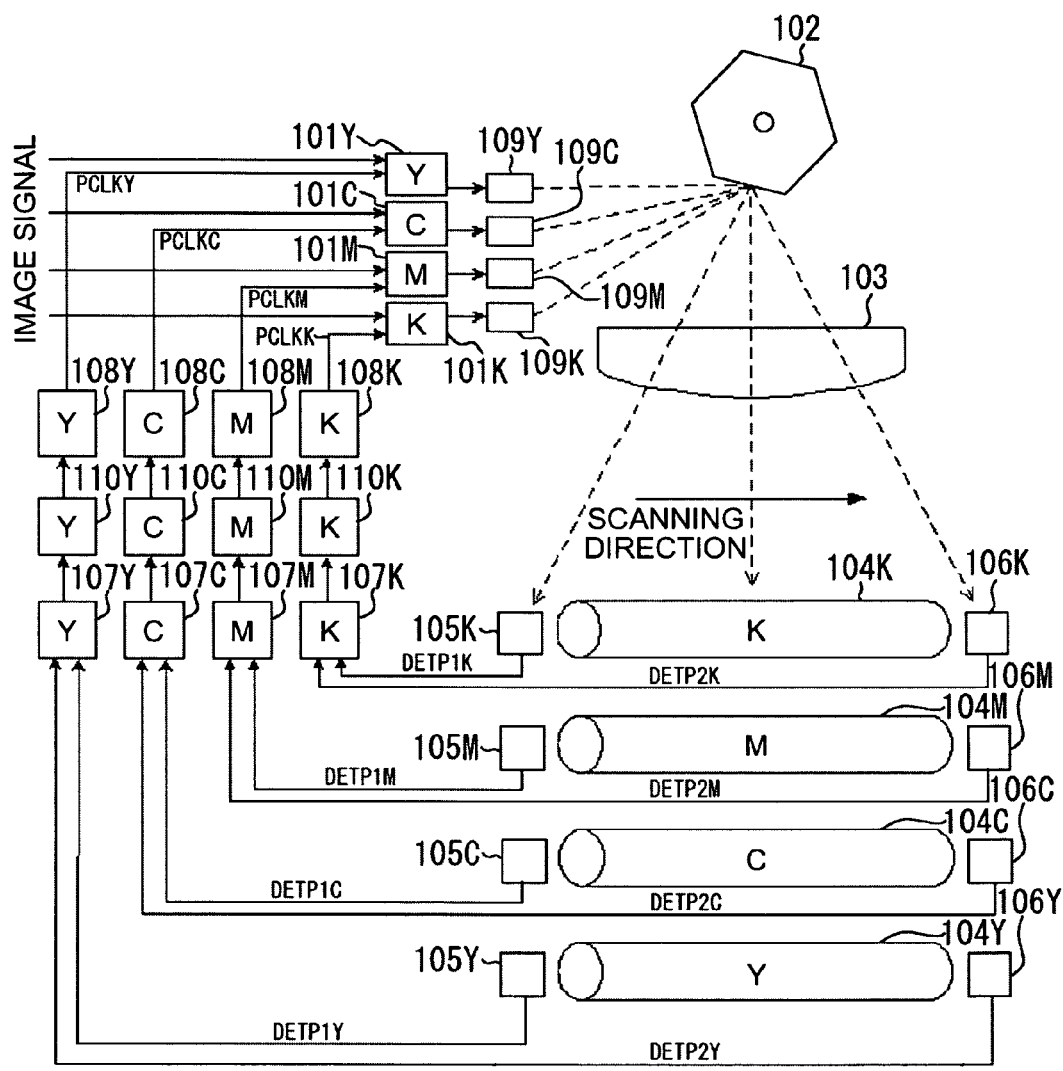
FIG. 31 is a diagram of the electrical configuration of the conventional laser-beam scanning device.

FIG. 2 is a block diagram of an electrical configuration of a laser-beam scanning device. Here, because the electrical configurations for Y, C, K, and M are the same as one another, one of the configurations is shown with each reference numeral without Y, C, K, and M. In FIG. 2, the reference numerals used in FIG. 31 are assigned to those corresponding to the components therein.

The laser-beam scanning device includes the LD 109 as a laser beam generator that turns on in synchronization with an image signal; and the polygon mirror 102 as a deflector for deflecting the laser beam, which is emitted from the LD 109, is changed to a parallel pencil by a collimate lens (not shown), and is further converged by a cylinder lens (not shown), in the main scanning direction at an equiangular velocity. The laser-beam scanning device also includes the fθ lens 103 for performing equiangular velocity/constant linear velocity conversion on the laser beam deflected; and the photosensitive element 104 as an image carrier to which the laser beam having passed through a barrel toroidal lens (BTL) (not shown) is radiated. The polygon mirror 102 is rotated by a polygon motor, and a drum-type photosensitive element or a belt-type photosensitive element is used as the photosensitive element 104. The BTL performs focusing mainly in a sub-scanning direction (a light collecting function and correction of a position in the sub-scanning direction (plane tilt or so)). Arranged around the photosensitive element 104 are the charging device 22 as a charger, the developing device 23 as a developing unit, the primary transfer device 24 as a transfer unit, the cleaning device 25 as a cleaner, and the decharging device 26 as a decharger, and an image is formed on the recording paper Pa as a transfer material through ordinary electrophotographic processes.

Optical sensors 105 and 106, which are laser beam detectors, are provided at a leading edge portion and a trailing edge portion of the laser beam in the main scanning direction in the laser-beam scanning device. The laser beam having passed through the fθ lens 103 enters the optical sensors 105 and 106 to thereby be detected. The optical sensor 105 corresponds to a first laser beam detector and the optical sensor 106 corresponds to a second laser beam detector according to the present invention. The optical sensor 105 serves also as a function of a synchronization detection sensor for detecting a laser-beam scanning synchronization signal that is a synchronization detection signal corresponding to a start timing of main scanning. In FIG. 2, only the fθ lens 103 is shown as a representative of a plurality of lenses provided.

The laser-beam scanning device further includes a time-difference measuring unit 107, a magnification correction controller 110, a write-clock generator circuit 108, and an LD modulator 101. More specifically, the time-difference measuring unit 107 has a calculation function of detecting a time difference between the leading-edge detection signal DETP1 and the trailing-edge detection signal DETP2 generated when the optical sensors 105 and 106 detect the laser beam and of averaging time differences. The time-difference measuring unit 107 performs measurement and calculation according to a setting timing from the control unit (CPU), and sends the result of the measurement and calculation to the write-clock generator circuit 108.

The magnification correction controller 110 includes a storage unit that stores set write clock frequency and an initial set value and/or a current set value of a phase control value, which are sent from the control unit (CPU). The magnification correction controller 110 also includes a function of calculating optimal write clock frequency and phase control value according to the result of the measurement and calculation, and/or a function of fixing write clock frequency and calculating an optimal phase control value according to the result of the measurement and calculation. The magnification correction controller 110 further includes a function of comparing the phase control value with a reference value set in the control unit (CPU), and sends a control signal indicating setting of a write clock and execution of phase control based on the setting in the control unit (CPU), to the write-clock generator circuit 108.

The write-clock generator circuit 108 includes a frequency modulator 108-1 and a phase controller 108-2, and generates a write clock and controls phase under control by the magnification correction controller 110. The frequency modulator 108-1 generates a clock having a frequency n-times of that of the write clock PCLK in response to reception of a clock from an oscillator (not shown). The phase controller 108-2 includes a function of dividing the PLL oscillation clock by n in synchronization with the leading-edge detection signal DETP1 which is a synchronization detection signal, and generating a write clock PCLK in synchronization with the leading-edge detection signal DETP1. The phase controller 108-2 also includes a function of shifting a write clock period pixel by pixel by adding or subtracting an integral multiple of a half period of the PLL oscillation clock to or from a specific period of the write clock.

The LD modulator 101 controls turning on of the LD 109 according to an image signal in synchronization with the write clock PCLK from the write-clock generator circuit 108, the write clock PCLK having been subjected to image magnification correction in the main scanning by changing the frequency and the phase.

The overview of the magnification correction of the laser-beam scanning device having the above configuration is explained below with reference to a flowchart of FIG. 3. At first, the time-difference measuring unit 107 measures a time difference using the leading-edge detection signal DETP1 and the trailing-edge detection signal DETP2 respectively generated when the optical sensors 105 and 106 detect the laser beam, performs measurement and calculation according to a setting timing signal from the CPU, and sends the result of the measurement and calculation to the magnification correction controller 110 (step S1). Next, the magnification correction controller 110 calculates optimal write clock frequency and phase control value according to the result of the measurement and calculation, and sends a control signal for setting of a write clock and performance of phase control to the write-clock generator circuit 108 (step S2). Then, the write-clock generator circuit 108 generates a write clock and controls the phase (step S3).

As shown in FIG. 4, the write-clock generator circuit 108 includes the frequency modulator 108-1 and the phase controller 108-2. The frequency modulator 108-1 includes a PLL circuit 122. The PLL circuit 122 is supplied with a reference clock vclk from an oscillator 121 and is supplied with frequency division data from the magnification correction controller 110, and outputs a PLL oscillation clock refclk obtained by dividing the reference clock vclk based on the frequency division data. The phase controller 108-2 includes a comparison clock generator 123, a comparator circuit 124, and a write-clock control circuit 125. The comparison clock generator 123 is supplied with the PLL oscillation clock refclk from the PLL circuit 122 and is supplied with phase data from the magnification correction controller 110, and generates a comparison clock in which the phase of the PLL oscillation clock refclk is shifted based on the phase data. The comparator circuit 124 compares the PLL oscillation clock refclk with the comparison clock. The write-clock control circuit 125 generates a write clock PCLK in synchronization with the leading-edge detection signal DETP1, based on the result of comparison output from the comparator circuit 124.

The phase data is used for instructing a shift amount of the phase of a write clock PCLK to correct uneven scan due to the property of the fθ lens 103, to correct dot displacement due to nonuniform rotation of the polygon mirror 102, and to correct dot displacement due to chromatic aberration of the laser beam. The phase data is given by a digital value of several bits.

Figure 5:
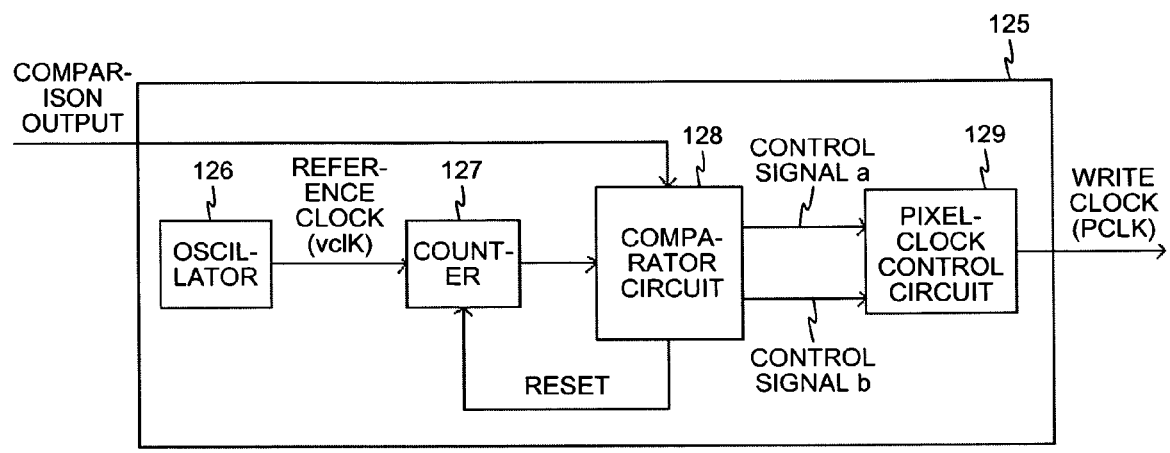
FIG. 5 is a block diagram of a write-clock control circuit in FIG. 4.

As shown in FIG. 5, the write-clock control circuit 125 includes an oscillator 126, a counter 127, a comparator circuit 128, and a pixel-clock control circuit 129. More specifically, the oscillator 126 generates a reference clock VCLK which is a high frequency clock being reference of the write clock PCLK. The counter 127 operates at the rising edge of the reference clock VCLK and counts the reference clock VCLK. The comparator circuit 128 compares a counter value of the counter 127, a preset value, and the result of comparison which instructs the amount of phase control that is a transition timing of the write clock PCLK and is given from the comparator circuit 124 (FIG. 4). The comparator circuit 128 supplies a reset signal to the counter 127 based on the result of comparison in the comparator circuit 128, generates a control signal a and a control signal b, and supplies the control signals to the pixel-clock control circuit 129. The pixel-clock control circuit 129 generates a write clock PCLK whose transition timing is controlled based on the control signals a and b.

Figure 6A:
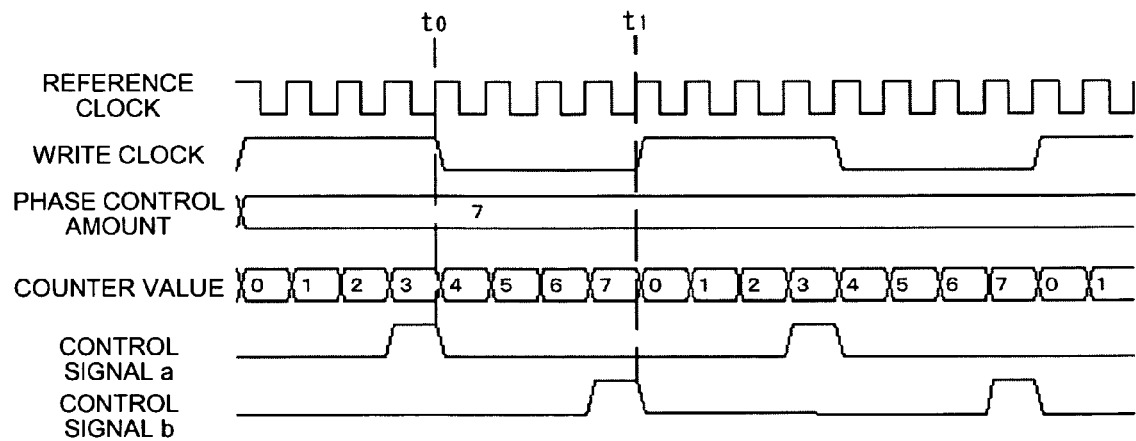
FIG. 6A to FIG. 6C are timing charts of an operation of the write-clock control circuit in FIG. 5.
Figure 6B:
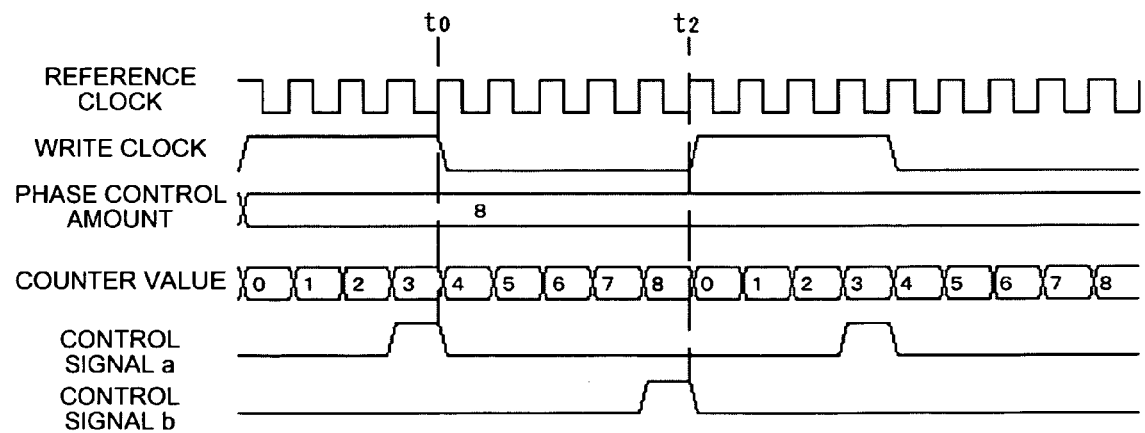
Figure 6C:
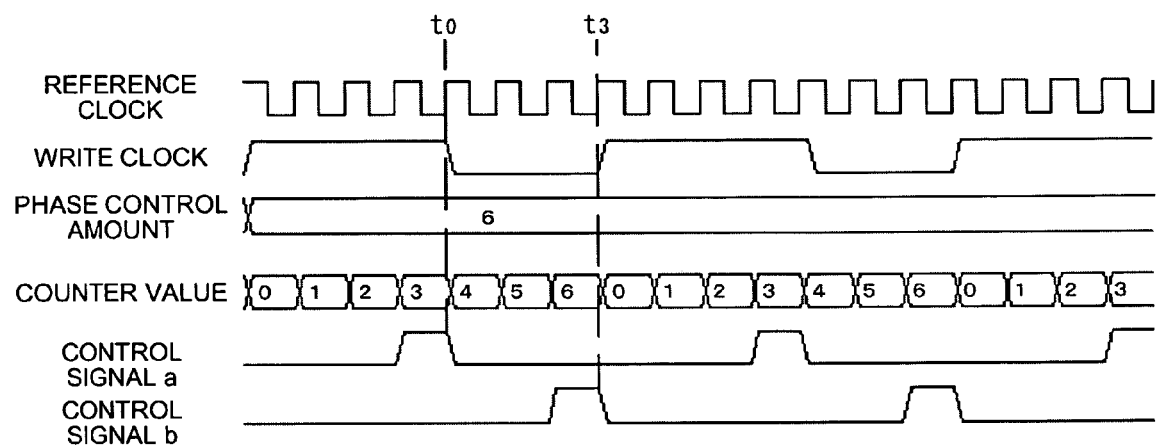

The operation of the write-clock control circuit 125 is explained below with reference to timing charts of FIG. 6A, FIG. 6B, and FIG. 6C. Herein, the write clock PCLK is 8-frequency division of the reference clock VCLK, and a duty ratio is 50% as normal. FIG. 6A indicates how to generate a normal write clock PCLK with a duty ratio of 50% which corresponds to 8 frequency-divided clocks of the reference clock VCLK. FIG. 6B indicates how to generate a write clock PCLK of which phase is advanced by ⅛ clock with respect to the 8 frequency-divided clocks of the reference clock VCLK. FIG. 6C indicates how to generate a write clock PCLK of which phase is delayed by ⅛ clock with respect to the 8 frequency-divided clocks of the reference clock VCLK.

At first, FIG. 6A is explained below. A value of "7" is given here as phase data, and "3" is preset in the comparator circuit 128. The counter 127 operates at the rising edge of the reference clock VCLK and performs counting. The comparator circuit 128 outputs the control signal a when the value of the counter 127 reaches "3". Because the control signal a is in the high state ("H"), the pixel-clock control circuit 129 causes the write clock PCLK to transition from "H" to the low state ("L") at the rising edge of the clock at time t0. Then, the comparator circuit 128 compares the amount of phase control given and the counter value, and outputs the control signal b if these values match.

In FIG. 6A, when the value of the counter 127 reaches "7", the comparator circuit 128 outputs the control signal b. Because the control signal b is "H", the pixel-clock control circuit 129 causes the write clock PCLK to transition from "L" to "H" at the rising edge of the clock at time t1. At the same time, the comparator circuit 128 causes the counter 127 to be reset and to recount from 0. This allows generation of the write clock PCLK with a duty ratio of 50% corresponding to 8-frequency division of the reference clock VCLK, as shown in FIG. 6A. It is noted that the duty ratio is changed by changing the set value of the comparator circuit 128.

Next, FIG. 6B is explained below. Herein, "8" is given as the phase data, and the counter 127 counts the reference clock VCLK. The comparator circuit 128 outputs the control signal a when the value of the counter 127 reaches "3". Because the control signal a is "H", the pixel-clock control circuit 129 causes the write clock PCLK to transition from "H" to "L" at the rising edge of the clock at time t0. Then, when the value of the counter 127 matches the amount of phase control ("8") given, the comparator circuit 128 outputs the control-signal b. Because the control signal b is "H", the pixel-clock control circuit 129 causes the write clock PCLK to transition from "L" to "H" at the rising edge of the clock at time t2. At the same time, the comparator circuit 128 causes the counter 127 to be reset and to recount from 0. This allows generation of the write clock PCLK whose phase is advanced by ⅛ clock with respect to the 8 frequency-divided clocks of the reference clock VCLK, as shown in FIG. 6B.

Then, FIG. 6C is explained below. Herein, "6" is given as the phase data, and the counter 127 counts the reference clock VCLK. The comparator circuit 128 first outputs the control signal a when the value of the counter 127 reaches "3". Because the control signal a is "H", the pixel-clock control circuit 129 causes the write clock PCLK to transition from "H" to "L" at the rising edge of the clock at time t0. Then, when the value of the counter 127 matches the amount of phase control ("6") given, the comparator circuit 128 outputs the control signal b. Because the control signal b is "H", the pixel-clock control circuit 129 causes the write clock PCLK to transition from "L" to "H" at the rising edge of the clock at time t3. At the same time, the comparator circuit 128 causes the counter 127 to be reset and to recount from 0. This allows generation of the write clock PCLK whose phase is delayed by ⅛ clock with respect to the 8 frequency-divided clocks of the reference clock VCLK, as shown in FIG. 6C.

By providing the amount of phase control in synchronization with, for example, the rising edge of the write clock PCLK, each phase of the write clock PCLK can be changed clock by clock. FIG. 7 is a timing chart indicating this case.

The configuration and the operation for the four colors of the laser-beam scanning device are explained below with reference to FIG. 8 and FIG. 9. In these figures, the reference numerals used in FIG. 30 and FIG. 31 are assigned to those corresponding to the components therein (conventional device).

Figure 30:
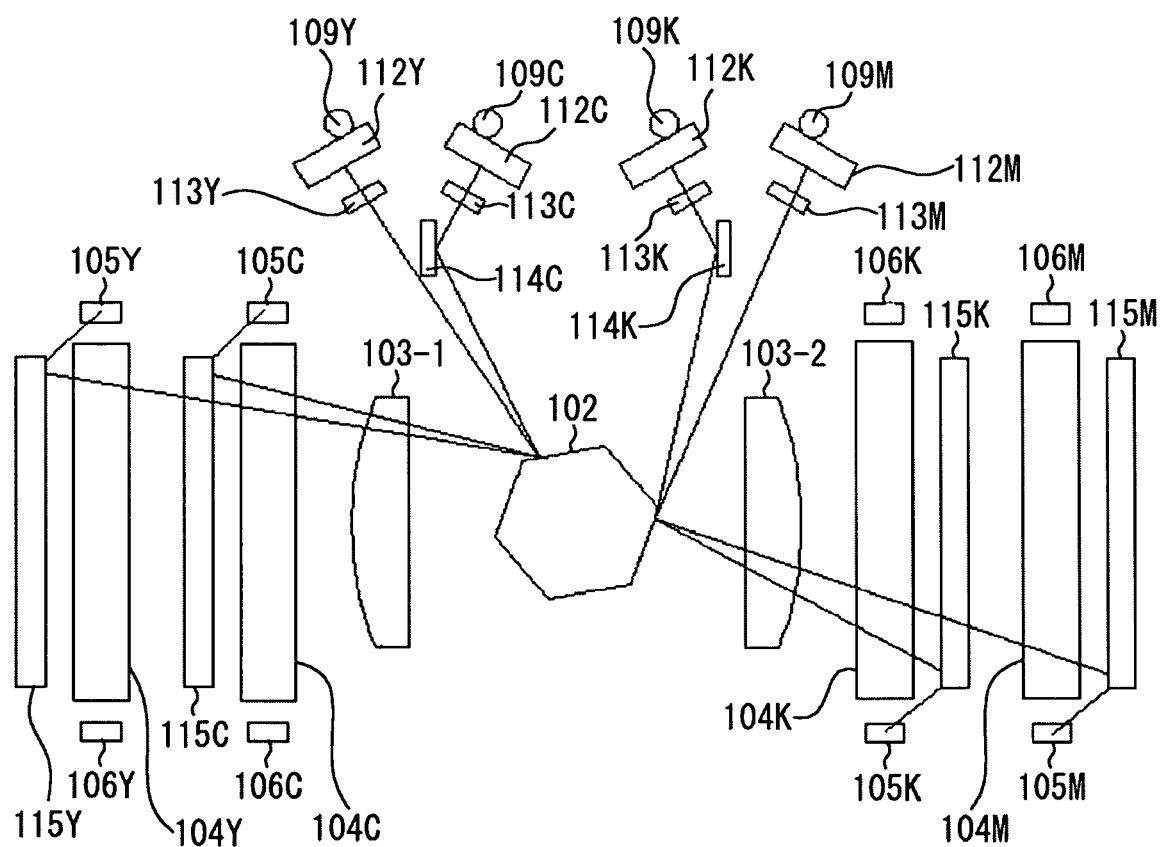
FIG. 30 is a diagram of the conventional laser-beam scanning device.

As shown in FIG. 8, the laser-beam scanning device according to the first embodiment is configured by omitting the optical sensors 106Y and 106M, that is, by omitting the optical sensor for detecting the trailing edge of a laser beam scanning along the photosensitive element 104Y and the optical sensor for detecting the trailing edge of a laser beam scanning along the photosensitive element 104M from the conventional laser-beam scanning device shown in FIG. 30. As shown in FIG. 9, the time-difference measuring unit 107Y is entered with the leading-edge detection signal DETP1Y generated in the optical sensor 105Y and with the trailing-edge detection signal DETP2C generated in the optical sensor 106C, and performs measurement and calculation based on a difference between times at which the detection signals are entered. The time-difference measuring unit 107M is entered with the leading-edge detection signal DETP1M generated in the optical sensor 105M and with the trailing-edge detection signal DETP2K generated in the optical sensor 106K, and performs measurement and calculation based on a difference between times at which the detection signals are entered.

As shown in FIG. 8, the light path of the laser beam scanning along the photosensitive element 104Y and the light path of the laser beam scanning along the photosensitive element 104C are close to each other. In this case, experimental data is obtained such that the magnification change amount due to the change in temperature between the two colors is small. Therefore, even if the trailing edges of the laser beams in the main scanning direction are set at the same position as each other, the magnification can be accurately controlled. The same holds for the relation between K and M.

As explained above, the image forming apparatus according to the first embodiment is configured to provide a smaller number of optical sensors for detecting the trailing edge of the laser beam in the main scanning direction than the number of developing devices (=number of photosensitive elements). Therefore, the number of optical sensors can be reduced, which allows cost reduction. Moreover, because the number of optical sensors is small, it is possible to prevent reduction in correction accuracy of magnification between colors relative to each other due to fluctuation in performance of the optical sensors. Furthermore, the frequency modulator and the phase controller (phase modulator) as a magnification correction controller are appropriately used, which allows achievement of adequate magnification correction.

Figure 10:
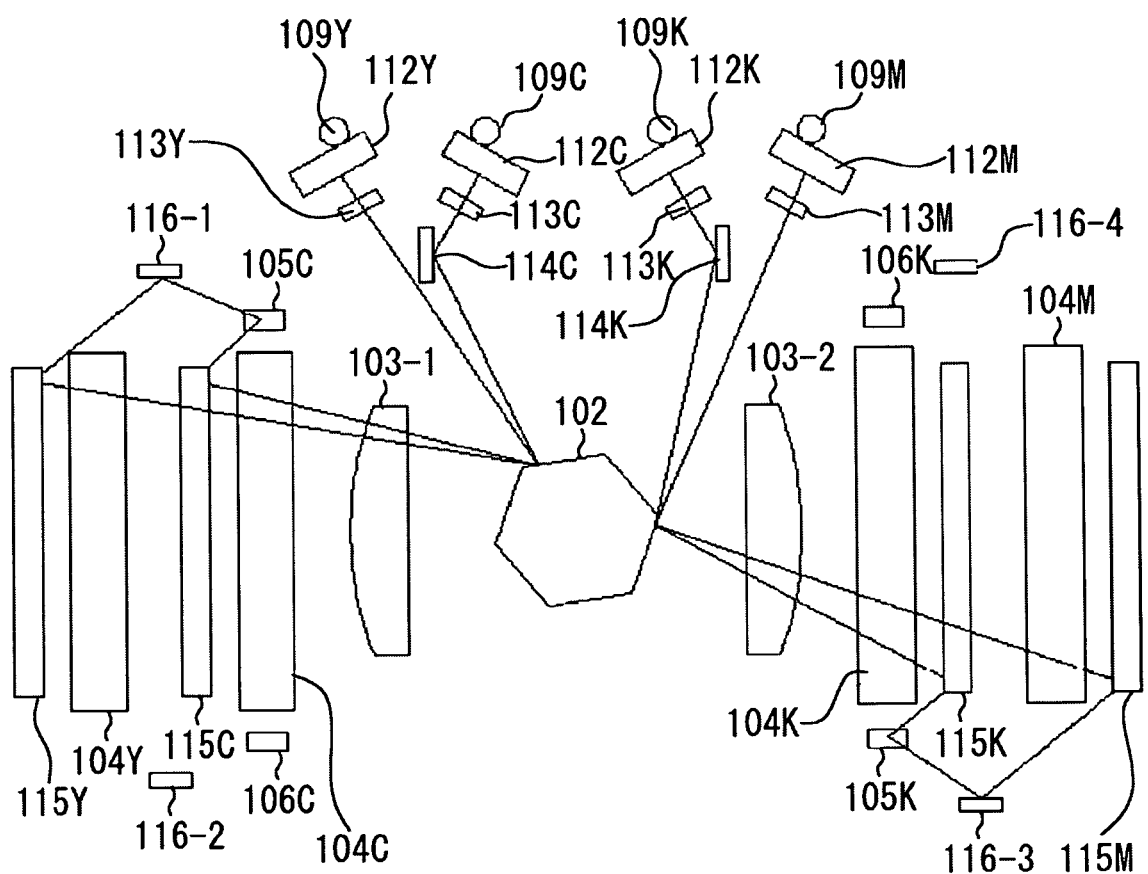
FIG. 10 is a diagram of a laser-beam scanning device according to a second embodiment of the present invention.
Figure 11:
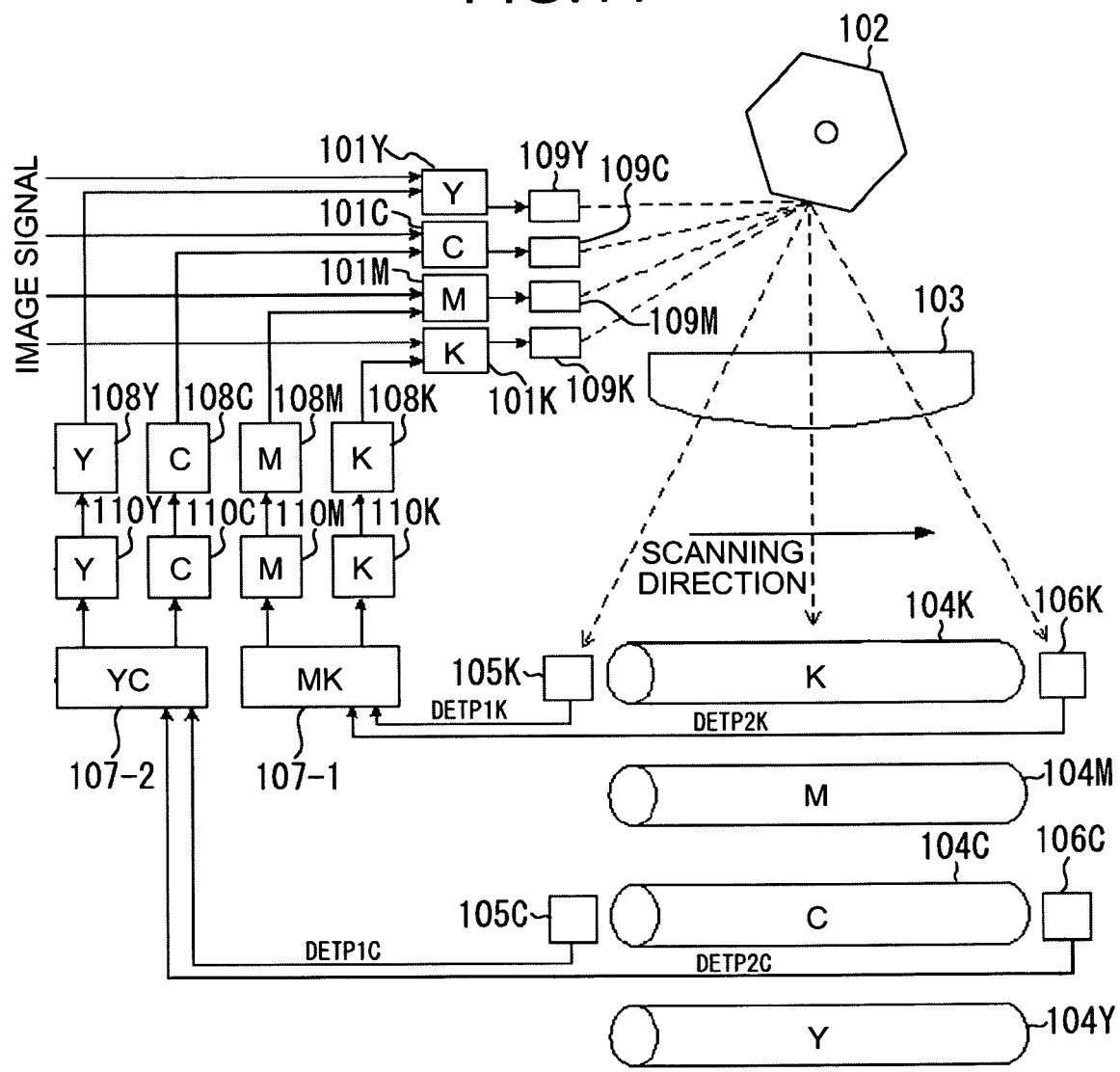
FIG. 11 is a diagram of an electrical configuration of the laser-beam scanning device according to the second embodiment.

FIG. 10 is a diagram of a laser-beam scanning device according to a second embodiment of the present invention, and FIG. 11 is a diagram of its electrical configuration. In the figures, the reference numerals used in FIG. 8 and FIG. 9 are assigned to those corresponding to the components therein.

As shown in FIG. 10, the laser-beam scanning device according to the second embodiment is configured by omitting the optical sensors 105Y and 105M, that is, by omitting the optical sensor for detecting the leading edge of a laser beam scanning along the photosensitive element 104Y and the optical sensor for detecting the leading edge of a laser beam scanning along the photosensitive element 104M, from the laser-beam scanning device according to the first embodiment as shown in FIG. 8. Instead of these optical sensors, a mirror 116-1 and a mirror 116-2 are provided to enter the laser beams into the optical sensors 105C and 106C, and a mirror 116-3 and a mirror 116-4 are also provided to enter the laser beams into the optical sensors 105K and 106K, respectively.

As shown in FIG. 11, a time-difference measuring unit 107-1 shared by K and M is entered with the leading-edge detection signal DETP1K generated in the optical sensor 105K and with the trailing-edge detection signal DETP2K generated in the optical sensor 106K, and performs measurement and calculation based on a difference between times at which the detection signals are entered. A time-difference measuring unit 107-2 shared by Y and C is entered with the leading-edge detection signal DETP1C generated in the optical sensor 105C and with the trailing-edge detection signal DETP2C generated in the optical sensor 106C, and performs measurement and calculation based on a difference between times at which the detection signals are entered. An output of the time-difference measuring unit 107-1 is supplied to the magnification correction controller 110M when the laser beam scans along the photosensitive element 104M, and is supplied to the magnification correction controller 110K when the laser beam scans along the photosensitive element 104K. Likewise, an output of the time-difference measuring unit 107-2 is supplied to the magnification correction controller 110Y when the laser beam scans along the photosensitive element 104Y, and is supplied to the magnification correction controller 110C when the laser beam scans along the photosensitive element 104C.

As explained above, the laser-beam scanning device according to the second embodiment is provided with a smaller number of optical sensors for detecting the trailing edge of the laser beam and a smaller number of optical sensors for detecting the leading edge thereof in the main scanning direction than the number of developing devices. Therefore, the number of optical sensors can be further reduced than that of the first embodiment, which allows cost reduction. Moreover, because the number of time-difference measuring units is also reduced by half, further cost reduction is achieved. Further, because the number of the optical sensors is small, it is possible to prevent reduction in correction accuracy of magnification between colors relative to each other due to fluctuation in performance of the optical sensors. Furthermore, data obtained through measurement and calculation in one time-difference measuring unit is used in a magnification correction controller for the other color. Therefore, the number of measuring times of time differences can be reduced, which allows reduction in load of software. It is noted that a magnification correction controller may be shared by the colors, and so may be a write-clock generator circuit.

Figure 12:
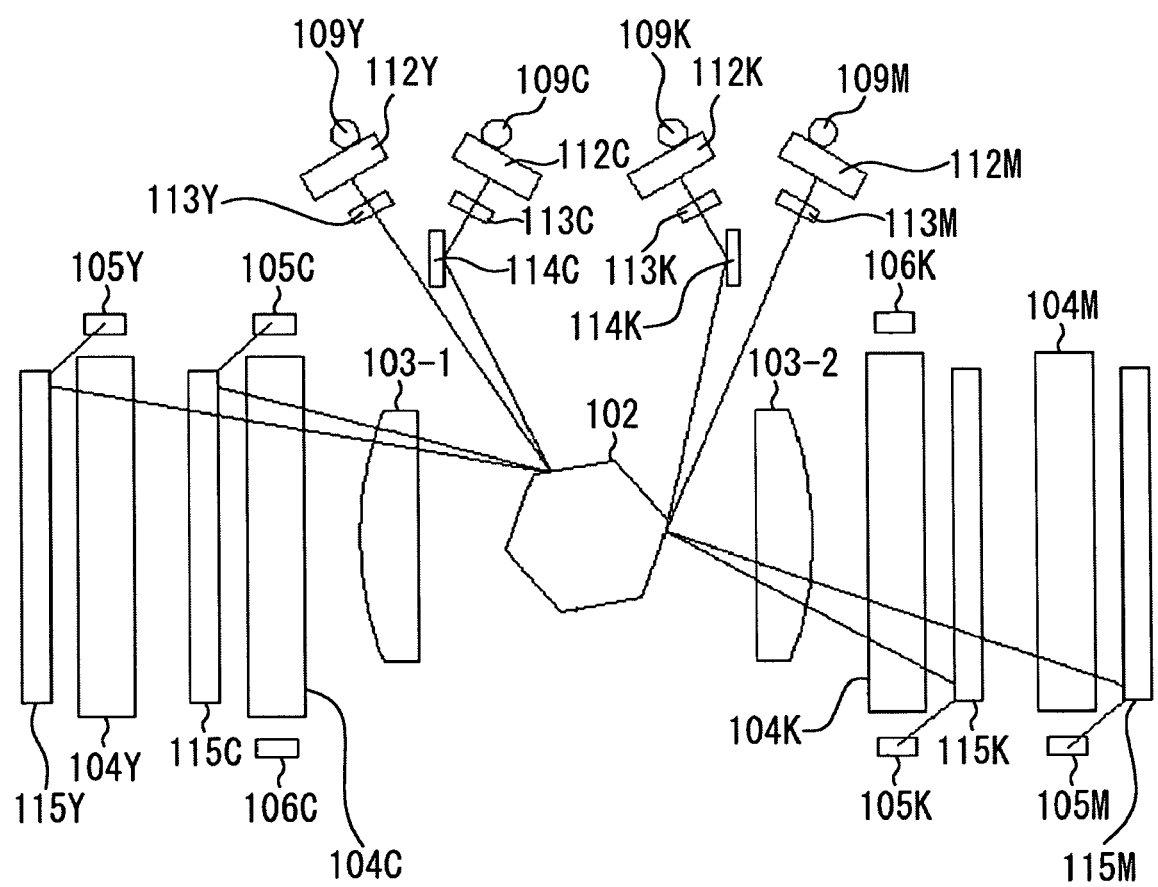
FIG. 12 is a diagram of a laser-beam scanning device according to a third embodiment of the present invention.
Figure 13:
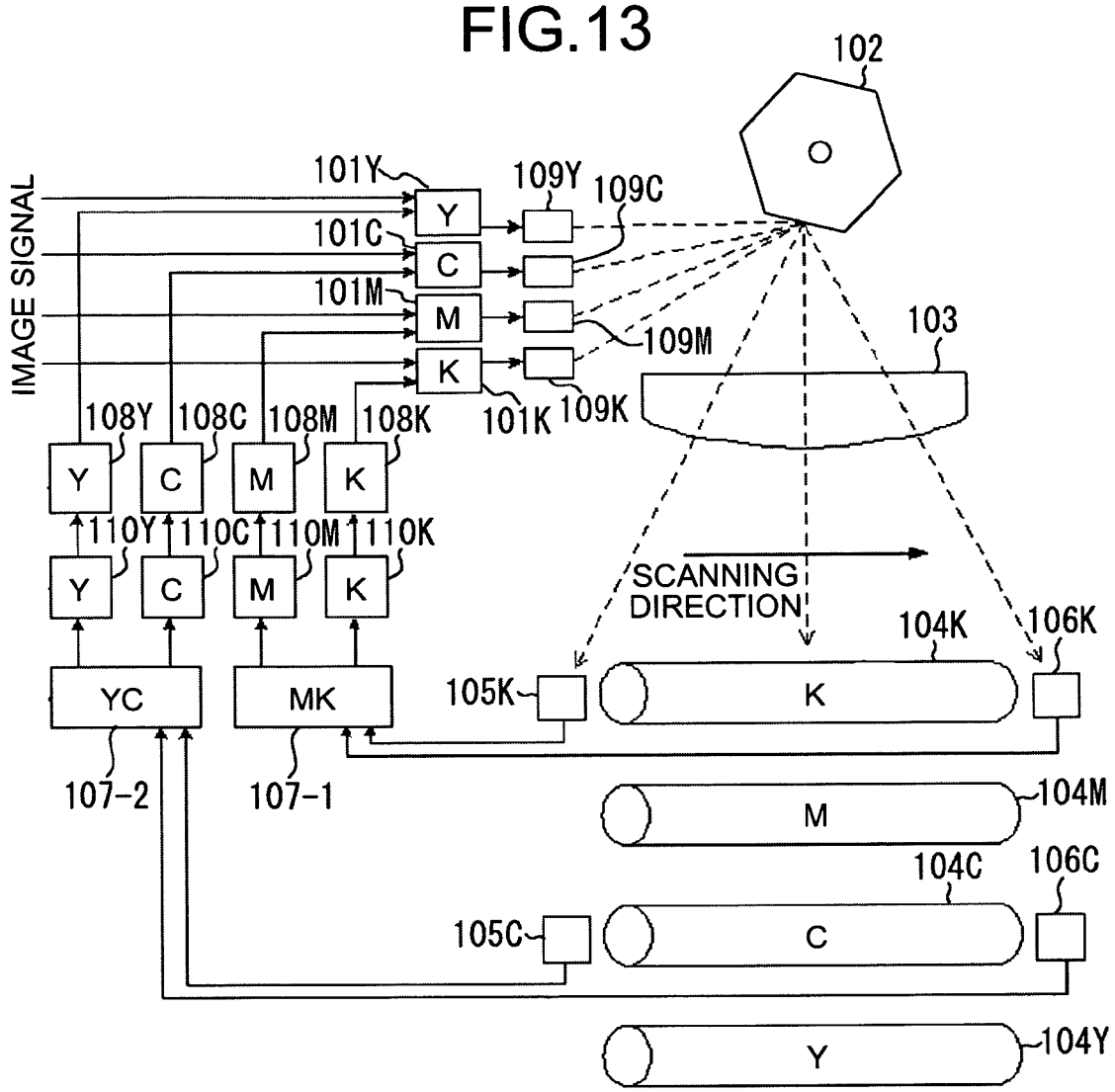
FIG. 13 is a diagram of an electrical configuration of the laser-beam scanning device according to the third embodiment.

FIG. 12 is a diagram of a laser-beam scanning device according to a third embodiment of the present invention, and FIG. 13 is a diagram of its electrical configuration. In the figures, the reference numerals used in FIG. 8 and FIG. 9 are assigned to those corresponding to the components therein.

As shown in FIG. 12, the configuration of the laser-beam scanning device according to the third embodiment is the same as that of the first embodiment (FIG. 8), and as shown in FIG. 13, the electrical configuration is the same as that of the second embodiment (FIG. 11). The optical sensor 105M detects the leading edge of the laser beam scanning along the photosensitive element 104M, and the optical sensor 105Y detects the leading edge of the laser beam scanning along the photosensitive element 104Y, but both results of detection are not supplied to the time-difference measuring units. The time-difference measuring unit 107-1 supplies a measurement/calculation value to the magnification correction controller 110K and holds the measurement/calculation value when the laser beam scans along the photosensitive element 104K, and supplies the measurement/calculation value held to the magnification correction controller 110M when the laser beam scans along the photosensitive element 104M. Likewise, the time-difference measuring unit 107-2 supplies a measurement/calculation value to the magnification correction controller 110Y and holds the measurement/calculation value when the laser beam scans along the photosensitive element 104Y, and supplies the measurement/calculation value held to the magnification correction controller 110C when the laser beam scans along the photosensitive element 104C.

As explained above, the laser-beam scanning device according to the third embodiment is provided with the smaller number of optical sensors for detecting the trailing edge of the laser beam in the main scanning direction than the number of developing devices, which allows cost reduction. Moreover, because the number of time-difference measuring units is reduced by half, further cost reduction is achieved. Further, because the number of the optical sensors is small, it is possible to prevent reduction in correction accuracy of magnification between colors relative to each other due to fluctuation in performance of the optical sensors. Furthermore, data obtained through measurement and calculation in one time-difference measuring unit is used in a magnification correction controller for the other color. Therefore, the number of measuring times of time differences can be reduced, which allows reduction in load of software.

Figure 14:
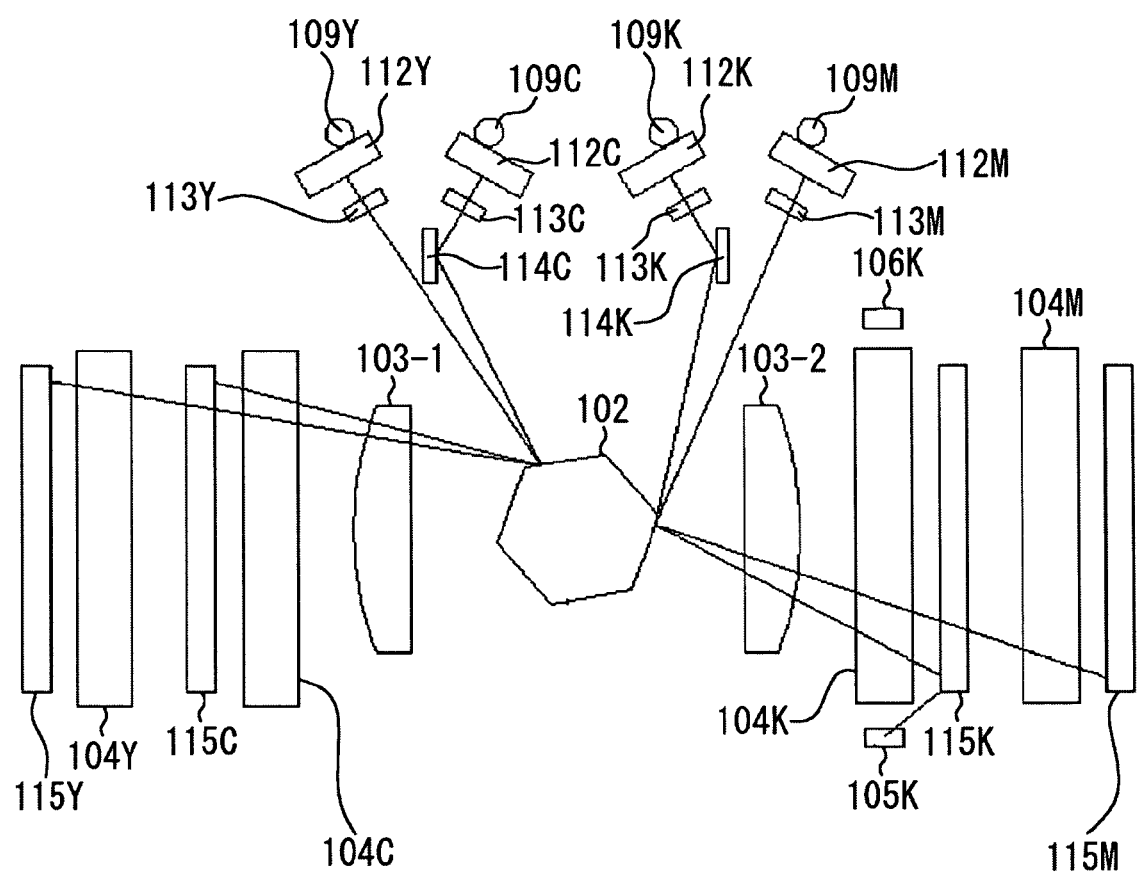
FIG. 14 is a diagram of a laser-beam scanning device according to a fourth embodiment of the present invention.
Figure 15:
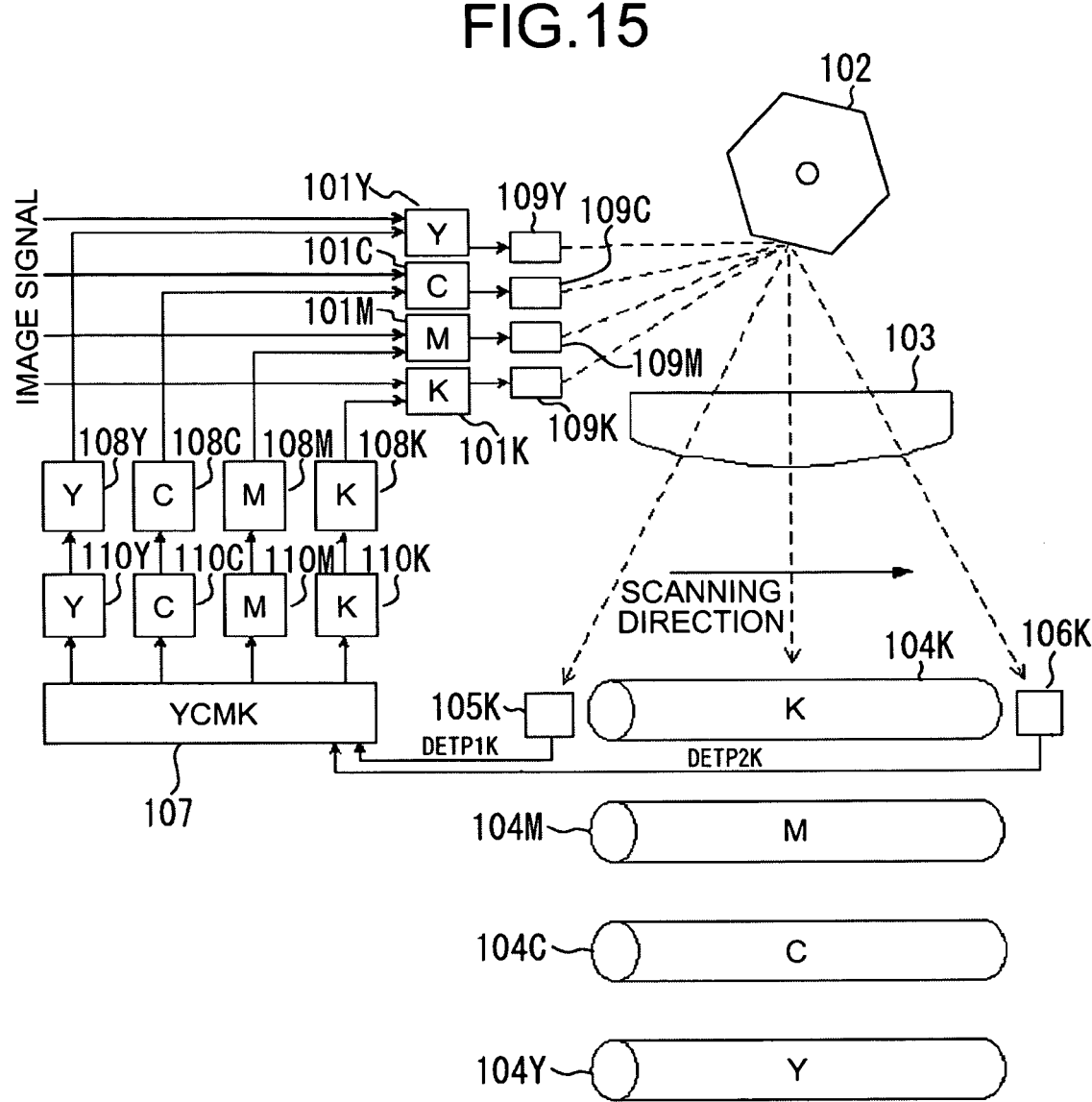
FIG. 15 is a diagram of an electrical configuration of the laser-beam scanning device according to the fourth embodiment.

FIG. 14 is a diagram of a laser-beam scanning device according to a fourth embodiment of the present invention, and FIG. 15 is a diagram of its electrical configuration. In the figures, the reference numerals used in FIG. 8 and FIG. 9 are assigned to those corresponding to the components therein.

As shown in FIG. 14, the laser-beam scanning device according to the fourth embodiment is configured by keeping only the optical sensors 105K and 106K as they are, namely, only the optical sensors for detecting the leading edge and the trailing edge of the laser beam scanning along the photosensitive element 104K, but omitting the other optical sensors from the conventional laser-beam scanning device of FIG. 30. As shown in FIG. 15, a time-difference measuring unit 107 shared by Y, C, M, and K is entered with the leading-edge detection signal DETP1K generated in the optical sensor 105K and with the trailing-edge detection signal DETP2K generated in the optical sensor 106K, and performs measurement and calculation based on a difference between times at which the detection signals are entered. And the result of the operation is supplied to the magnification correction controllers 110Y, 110C, 110M, and 110K. It is noted that the magnification correction controllers 110Y to 110K may also be integrated into one unit, and so may be the write-clock generator circuits 108Y to 108K. The optical sensor and other components only for K are provided in the fourth embodiment, but this is because only K is used when a monochrome image is formed, and hence, it is appropriate to measure K with the highest use frequency.

As explained above, the laser-beam scanning device according to the fourth embodiment is configured to provide the optical sensors for detecting the leading edge and the trailing edge of the laser beam scanning along the photosensitive element and the time-difference measuring unit for only one color, and time difference data measured by the time-difference measuring unit is used in the magnification correction controllers for all of the other colors, which allows cost reduction. Furthermore, the number of time-difference measuring units is a minimum, which allows further cost reduction and reduction in load of software.

Figure 16:
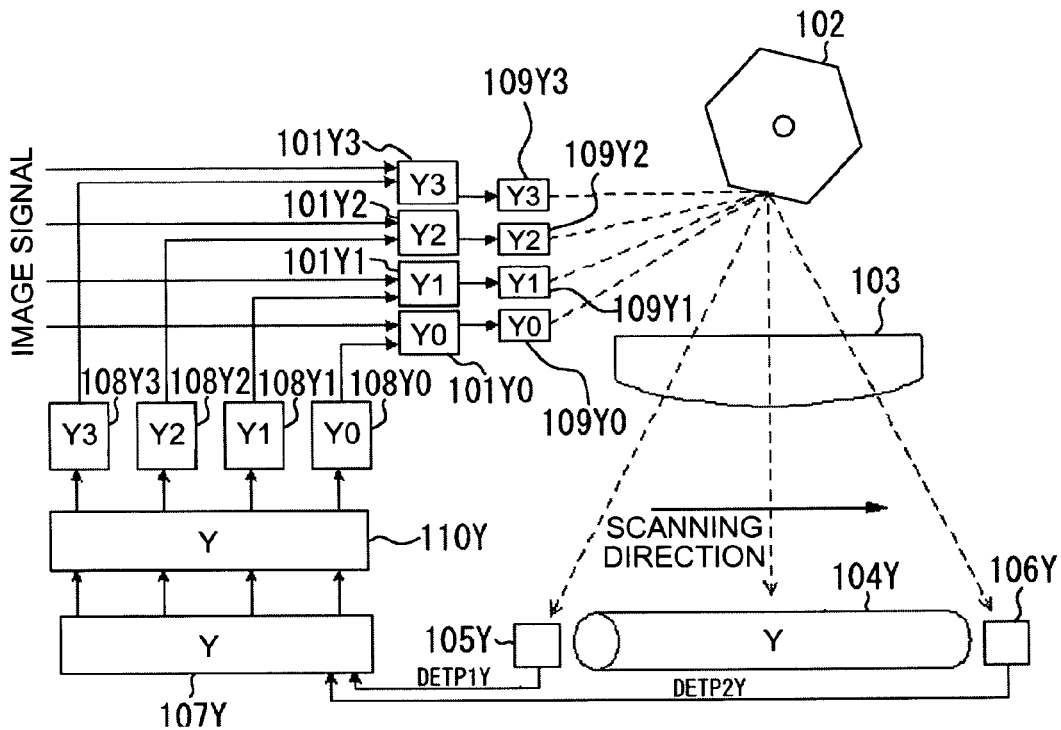
FIG. 16 is a diagram of an electrical configuration of the laser-beam scanning device according to the fifth embodiment.

FIG. 16 is a diagram of an electrical configuration of a laser-beam scanning device according to a fifth embodiment of the present invention. In FIG. 16, the reference numerals used in FIG. 9 are assigned to those corresponding to the components therein. This figure shows only the configuration for Y, but each configuration for the other three colors is the same as that for Y.

In the fifth embodiment, the polygon mirror 102 concurrently scans four laser beams, and the optical sensors 105Y and 106Y concurrently detect leading edges and trailing edges of the four laser beams in the main scanning direction. The time-difference measuring unit 107Y is entered with the leading-edge detection signal DETP1Y generated in the optical sensor 105Y and with the trailing-edge detection signal DETP2Y generated in the optical sensor 106Y, performs measurement and calculation based on a difference between times at which the detection signals are entered, and supplies the results thereof to the magnification correction controller 110Y. The magnification correction controller 110Y supplies the results to write-clock generator circuits 108Y0, 108Y1, 108Y2, and 108Y3. The write-clock generator circuits 108Y0, 108Y1, 108Y2, and 108Y3 send write clocks PCLK to LD modulators 101Y0, 101Y1, 101Y2, and 101Y3, respectively. The LD modulators 101Y0, 101Y1, 101Y2, and 101Y3 control turning on of LDs 109Y0, 109Y1, 109Y2, and 109Y3 according to image signals in synchronization with the write clocks PCLK. Here, the write-clock generator circuits 108Y0, 108Y1, 108Y2, and 108Y3 may be integrated into one unit. Furthermore, an LD array may be used as the LDs 109Y0, 109Y1, 109Y2, and 109Y3.

As explained above, in the fifth embodiment, because a plurality of laser beams are made to enter into the optical sensors 105Y and 106Y, the number of optical sensors can be reduced as compared with that when the optical sensor is provided for each laser beam. Therefore, it is possible to prevent reduction in correction accuracy of magnification between colors relative to each other due to fluctuation in performance of the optical sensors, which allows cost reduction without degradation of image quality.

Figure 17:
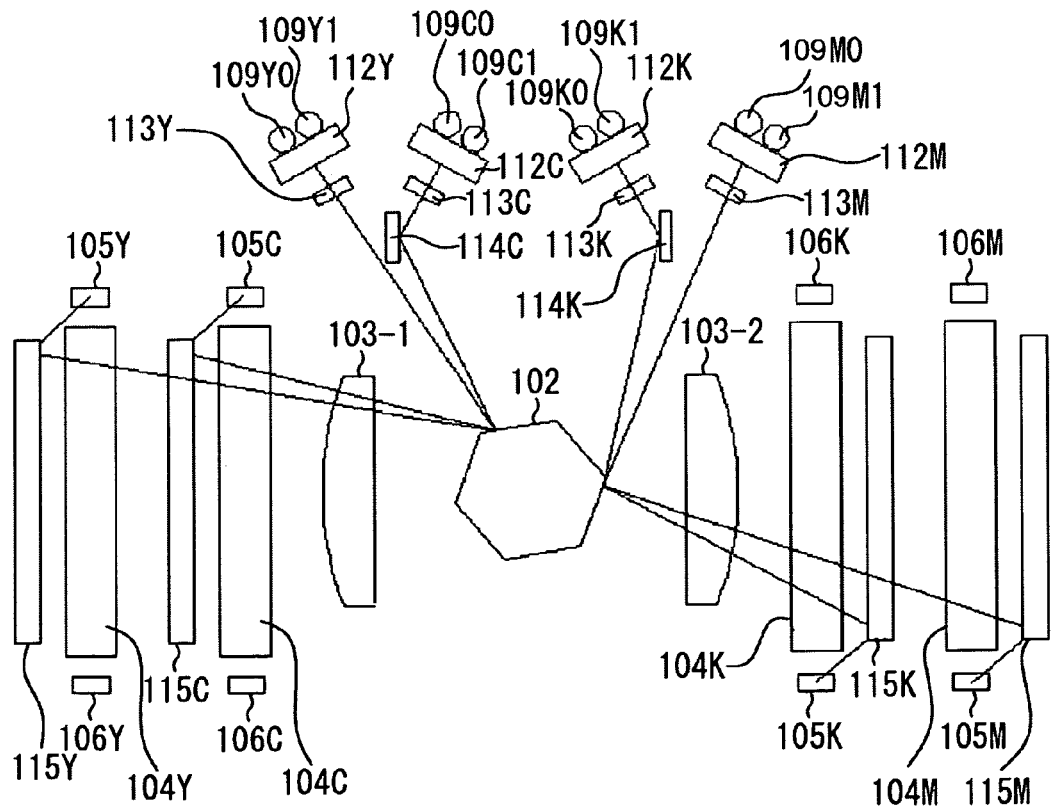
FIG. 17 is a diagram of a laser-beam scanning device according to a sixth embodiment of the present invention.
Figure 18:
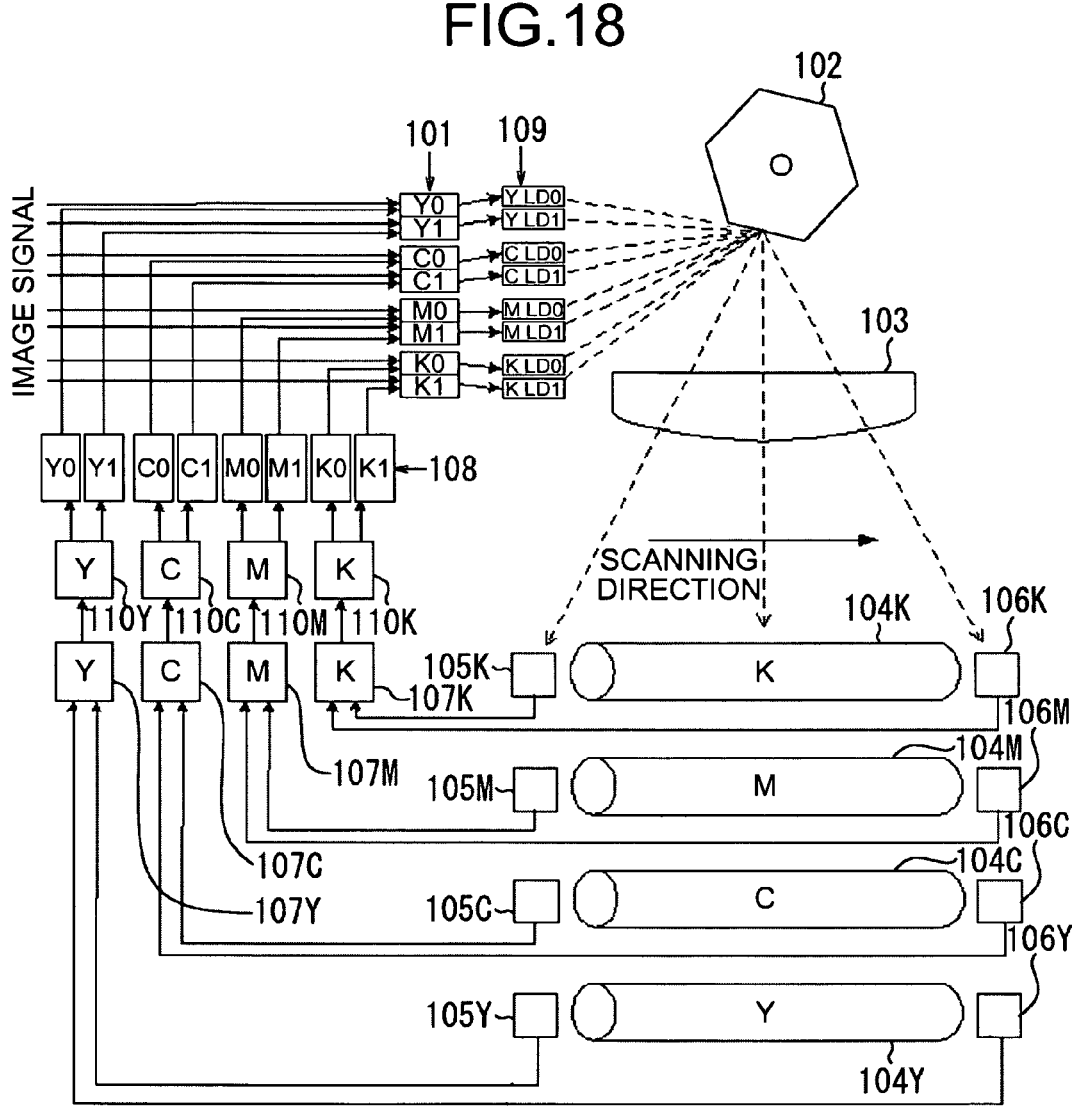
FIG. 18 is a diagram of an electrical configuration of the laser-beam scanning device according to the sixth embodiment.

FIG. 17 is a diagram of a laser-beam scanning device according to a sixth embodiment of the present invention, and FIG. 18 is a diagram of its electrical configuration. In the figures, the reference numerals used in FIG. 8 and FIG. 9 are assigned to those corresponding to the components therein.

As shown in FIG. 17, the sixth embodiment is configured to provide LDs 109Y0 and 109Y1, LDs 109C0 and 109C1, LDs 109K0 and 109K1, and LDs 109M0 and 109M1, for generating two laser beams for each color of Y, C, K, and M. As shown in FIG. 18, data generated in the magnification correction controllers 110Y, 110C, 110M, and 110K are supplied to the write-clock generator circuits 108Y0, 108Y1, 108C0, 108C1, 108M0, 108M1, 108K0, and 108K1, respectively. The write-clock generator circuits 108Y0, 108Y1, 108C0, 108C1, 108M0, 108M1, 108K0, and 108K1 transmit write clocks PCLK to the LD modulators 101Y0, 101Y1, 101C0, 101C1, 101M0, 101M1, 101K0, and 101K1, respectively. The LD modulators 101Y0, 101Y1, 101C0, 101C1, 101M0, 101M1, 101K0, and 101K1 control turning on of the LDs 109Y0, 109Y1, 109C0, 109C1, 109K0, 109K1, 109M0, and 109M1, respectively, according to image signals in synchronization with the write clocks PCLK.

In other words, the fifth embodiment is configured so that four laser beams are radiated to each optical sensor, but two laser beams are radiated in the sixth embodiment. Therefore, in the sixth embodiment, cost reduction can also be achieved without degradation of image quality as that of the fifth embodiment.

Figure 19:
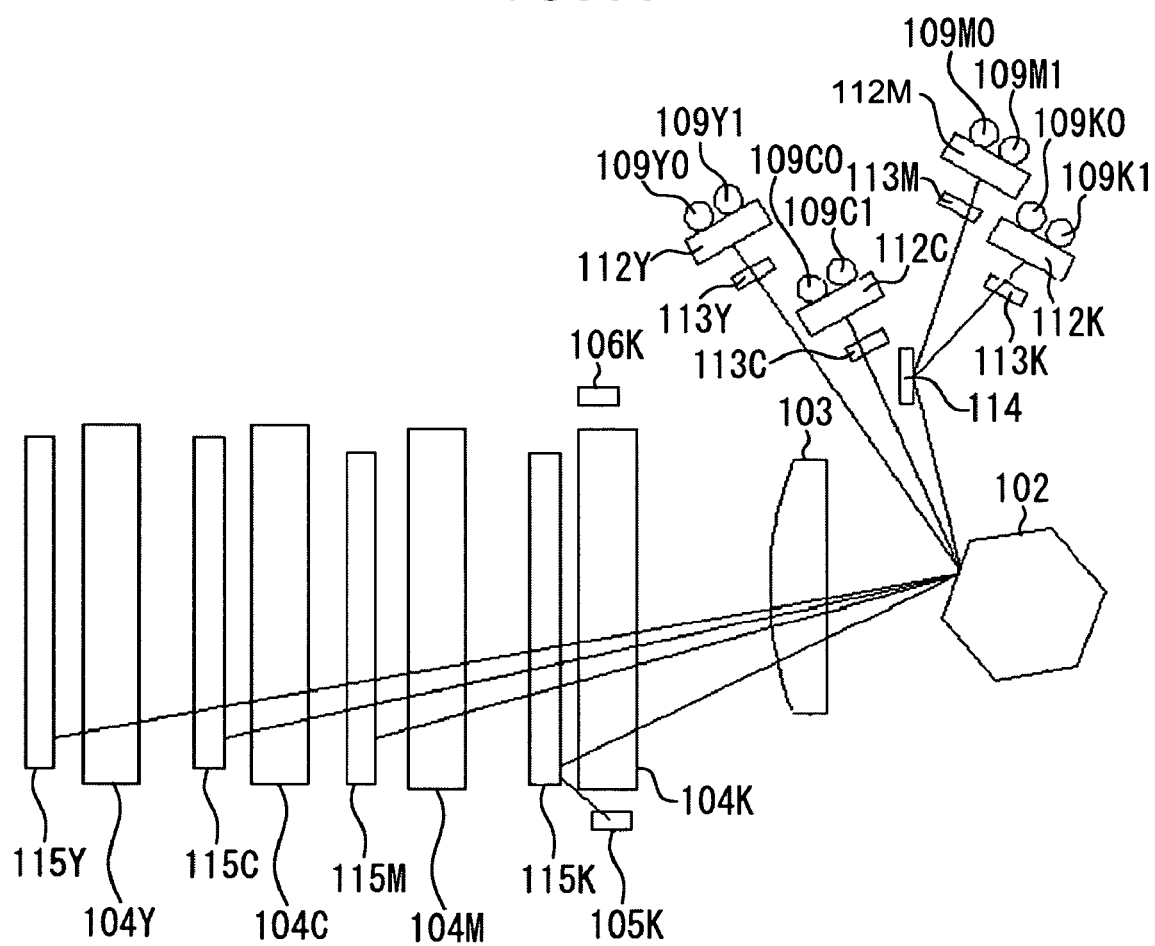
FIG. 19 is a diagram of a laser-beam scanning device according to a seventh embodiment of the present invention.
Figure 20:
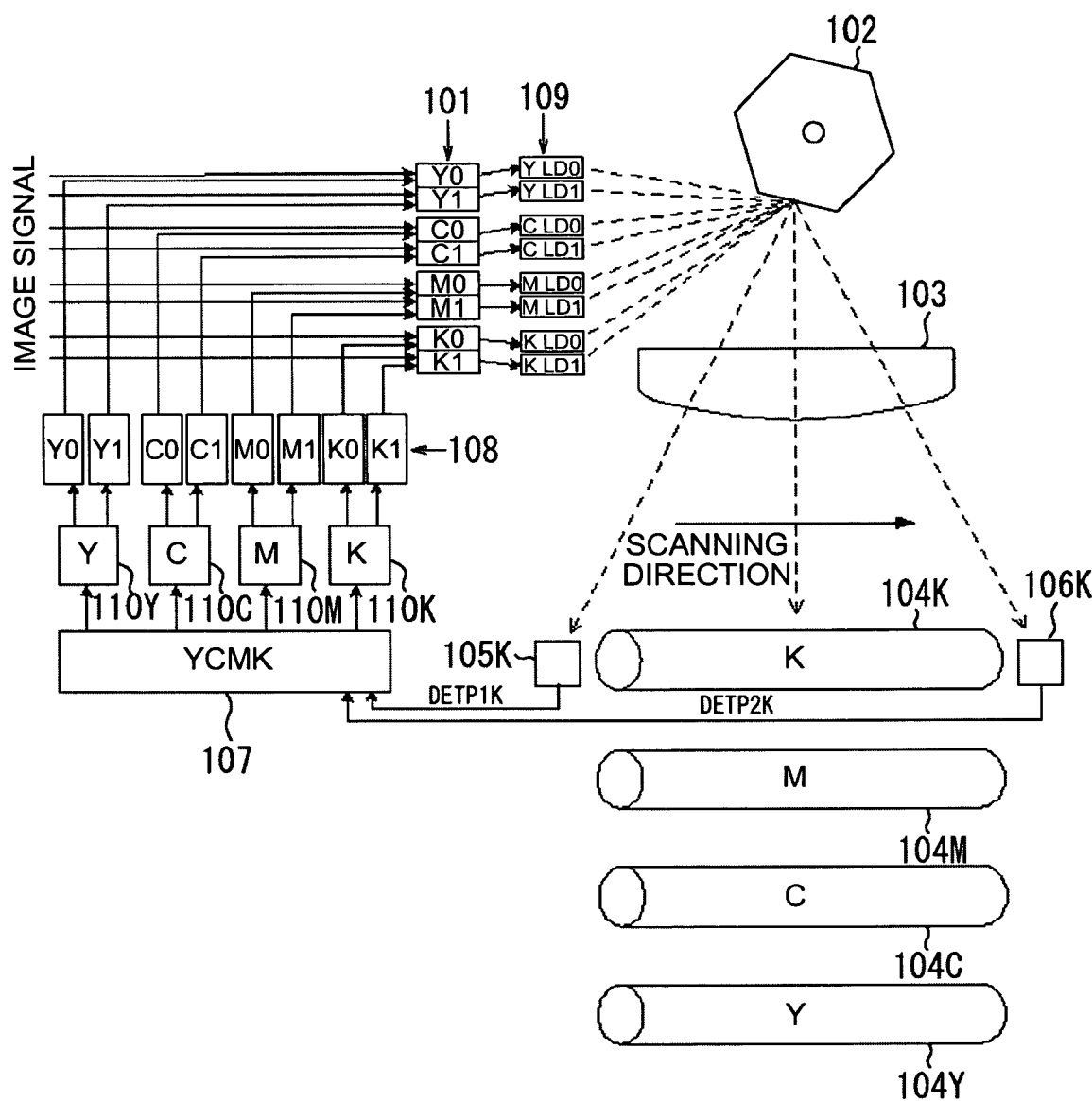
FIG. 20 is a diagram of an electrical configuration of the laser-beam scanning device according to the seventh embodiment.

FIG. 19 is a diagram of a laser-beam scanning device according to a seventh embodiment of the present invention, and FIG. 20 is a diagram of its electrical configuration. In the figures, the reference numerals used in FIG. 17 and FIG. 18 are assigned to those corresponding to the components therein.

As shown in FIG. 19, in the laser-beam scanning device according to the seventh embodiment, the photosensitive elements 104Y, 104C, 104M, and 104K for the four colors and other components are arranged on one side of the polygon mirror 102. Similarly to the fourth embodiment, the optical sensor 105K for detecting the leading edge of a laser beam and the optical sensor 106K for detecting the trailing edge thereof are provided only for the laser beam scanning along the photosensitive element 104K. Furthermore, similarly to the sixth embodiment, two laser beams are scanned for each color.

As shown in FIG. 20, the time-difference measuring unit 107 shared by Y, C, M, and K is entered with the leading-edge detection signal DETP1K generated in the optical sensor 105K and with the trailing-edge detection signal DETP2K generated in the optical sensor 106K, and performs measurement and calculation based on a difference between times at which the detection signals are entered. And the result of the operation is supplied to the magnification correction controllers 110Y, 110C, 110M, and 110K. Correction data generated in the magnification correction controllers 110Y, 110C, 110M, and 110K are supplied to the write-clock generator circuits 108Y0, 108Y1, 108C0, 108C1, 108M0, 108M1, 108K0, and 108K1, respectively. The write-clock generator circuits 108Y0, 108Y1, 108C0, 108C1, 108M0, 108M1, 108K0, and 108K1 transmit write clocks PCLK to the LD modulators 101Y0, 101Y1, 101C0, 101C, 101M0, 101M1, 101K0, and 101K1, respectively. The LD modulators 101Y0, 101Y1, 101C0, 101C1, 101M0, 101M1, 101K0, and 101K1 control turning on of the LDs 109Y0, 109Y1, 109C0, 109C1, 109M0, 109M1, 109K0, and 109K1, respectively, according to image signals in synchronization with the write clocks PCLK. Here, the magnification correction controllers 110Y to 110K may also be integrated into one unit, and so may be the write-clock generator circuits 108Y0 to 108K1.

Figure 21:
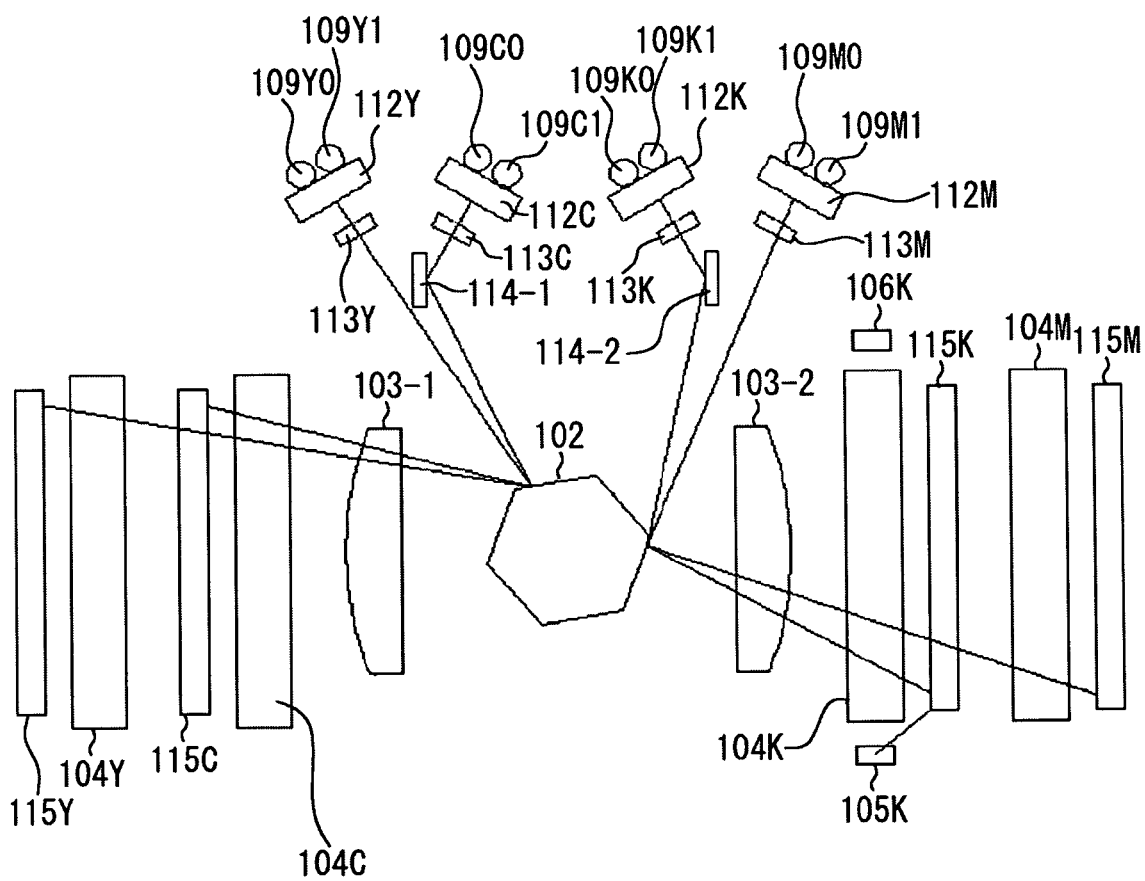
FIG. 21 is a diagram of a laser-beam scanning device according to an eighth embodiment of the present invention.

FIG. 21 is a diagram of a laser-beam scanning device according to an eighth embodiment of the present invention. In FIG. 21, the reference numerals used in FIG. 19 are assigned to those corresponding to the components therein. It is noted that an electrical configuration of the laser-beam scanning device according to the eighth embodiment is the same as that of the seventh embodiment (FIG. 20).

As shown in FIG. 21, similarly to the fourth embodiment, the laser-beam scanning device according to the eighth embodiment includes the optical sensor 105K for detecting the leading edge of only a laser beam scanning along the photosensitive element 104K, and the optical sensor 106K for detecting the trailing edge thereof. Furthermore, similarly to the sixth embodiment, two laser beams are scanned for each color. In other words, unlike the seventh embodiment in which the photosensitive elements for the four colors are arranged on one side of the polygon mirror 102, in the eighth embodiment, the photosensitive elements for the four colors are arranged on both sides of the polygon mirror 102 by two colors so as to be opposite to each other.

Figure 22:
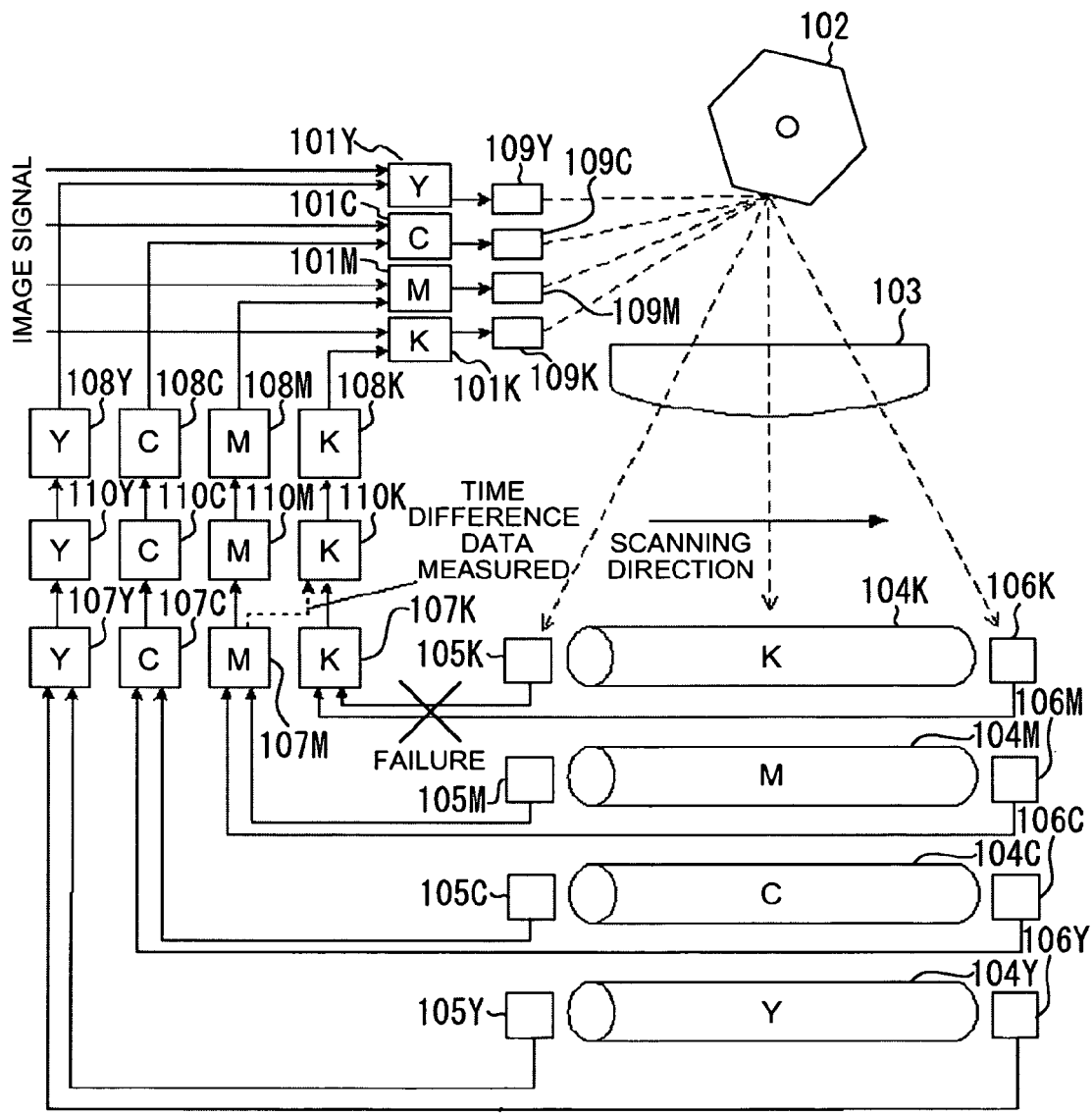
FIG. 22 is a diagram of an electrical configuration of the laser-beam scanning device according to the ninth embodiment.

FIG. 22 is a diagram of an electrical configuration of a laser-beam scanning device according to a ninth embodiment of the present invention. In FIG. 22, the reference numerals used in FIG. 31 are assigned to those corresponding to the components therein (conventional device).

In the ninth embodiment, if a time-difference measuring unit cannot acquire accurate time difference data because of failure or the like in any optical sensor for detecting the leading edge or the trailing edge of a laser beam scanning across a corresponding photosensitive element for a color (K in FIG. 22), time difference data acquired in a time-difference measuring unit for one of the other colors (M in FIG. 22) is used instead. In the conventional technology, however, when failure occurs, for example, in the optical sensor 106K, the time difference data cannot be obtained from the time-difference measuring unit 107K until this sensor is replaced, and magnification correction cannot thereby be performed on K. However, in the ninth embodiment, the time difference data sent from the time-difference measuring unit 107M is used to enable magnification correction of K although accuracy is slightly decreased. In FIG. 22, the optical sensor 106Y may be omitted similarly to FIG. 9.

Figure 23:
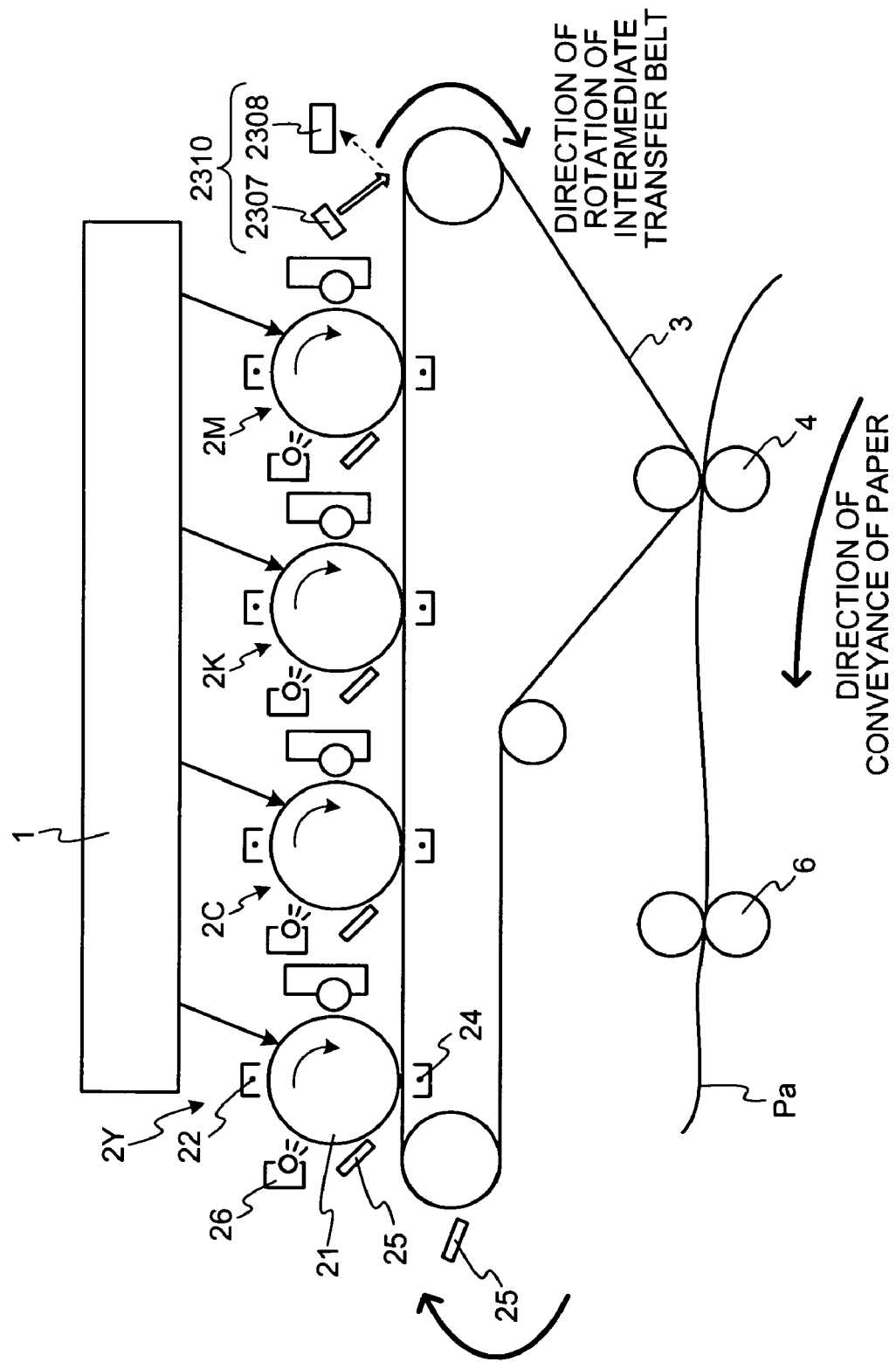
FIG. 23 is a schematic diagram of an image forming apparatus according to a tenth embodiment of the present invention.

FIG. 23 is a schematic diagram of an image forming apparatus according to a tenth embodiment of the present invention. The image forming apparatus according to the tenth embodiment is a tandem-type full color machine having the almost same configuration as that of the image forming apparatuses according to the first to the ninth embodiments. A different point from the image forming apparatuses is that the image forming apparatus according to the tenth embodiment includes a registration sensor 2310. However, because the rest of the components are the same as these of the image forming apparatuses according to the first to the ninth embodiments, the same reference numerals are used for the same components, and explanation thereof is omitted. More specifically, the image forming apparatus according to the tenth embodiment adopts processes, for calculating the amount of color shift and correcting the color shift explained hereinafter, in the image forming apparatuses according to the second, the third, the fourth, and the seventh embodiments. Each of these embodiments has the magnification correction controller 110 that corrects the magnification in the main scanning direction by changing each timing of image signals corresponding to a specific color and a color different from the specific color based on time difference data measured for the specific color.

The registration sensor 2310 detects a color-shift detection pattern previously formed on the intermediate transfer belt 3, and includes a light source 2307 for emitting a light beam, and a light receiving sensor 2308 that receives the light beam reflected by the intermediate transfer belt 3. In FIG. 23, only one registration sensor 2310 is shown for simplicity of illustration, but, in an actual case, four pieces of registration sensors 2310 are provided near the respective photosensitive elements. The light source 2307 is, for example, LED and LD, and the light receiving sensor 2308 is, for example, a photodiode (PD) and a phototransistor.

Figure 24:
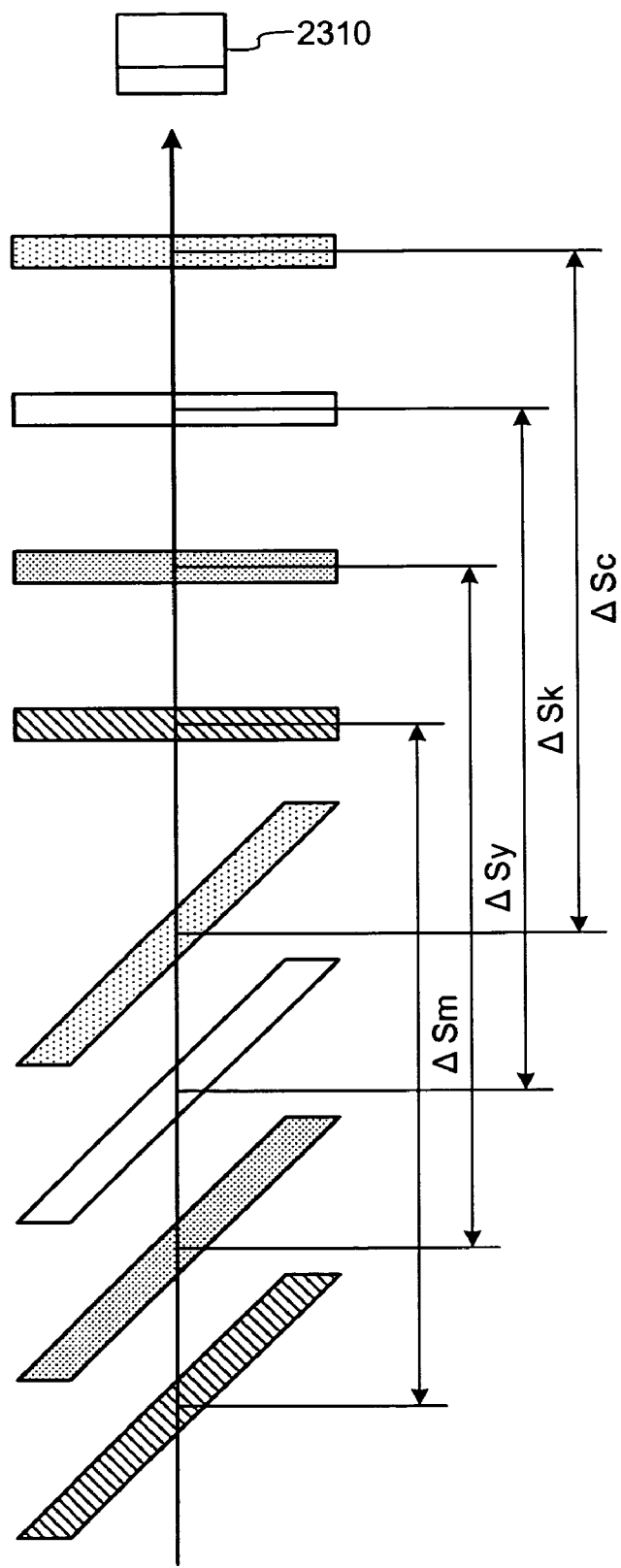
FIG. 24 is a pattern diagram of a color-shift detection pattern formed on an intermediate transfer belt.

FIG. 24 is a pattern diagram of a color-shift detection pattern formed on the intermediate transfer belt 3. A pattern including horizontal lines and diagonal lines, which are drawn using the four colors of Y, M, C, and K, is formed on the intermediate transfer belt 3, the color-shift detection pattern is read by the registration sensor 2310, each length (ΔSc, ΔSk, ΔSy, ΔSm) between the horizontal lines and the diagonal lines is counted by a timer. A color shift calculator converts a value counted to the amount of registration in the main scanning, and writing timings in the main scanning direction and the sub scanning direction are adjusted by a controller (not shown). Because the calculated amount of the color shift is used later, it is saved in a memory (not shown). Although the color-shift detection pattern is formed on the intermediate transfer belt 3 in the tenth embodiment, the color-shift detection pattern may be formed on an intermediate medium such as a conveyance belt.

Figure 25:
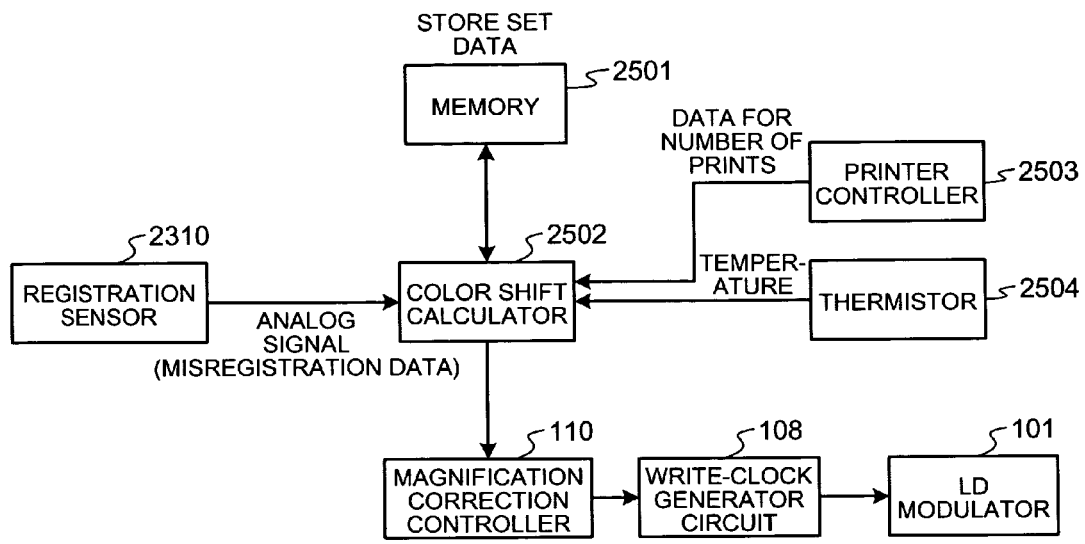
FIG. 25 is a block diagram of a relationship between components related to the color-shift correction process.

FIG. 25 is a block diagram of a relationship between components related to the color-shift correction process. The magnification correction controller 110, the write-clock generator circuit 108, and the LD modulator (LD driver) 101 are the same as these of the first to the ninth embodiments.

A thermistor 2504 detects an atmospheric temperature of a location where the apparatus is installed or a local temperature of the apparatus, and sends out the temperatures detected to a color shift calculator 2502. A printer controller 2503 counts the number of prints and sends out the number of prints counted to the color shift calculator 2502.

The color shift calculator 2502 is a processor that calculates the amount of color shift from the color-shift detection pattern read by the registration sensor 2310. The amount of color shift calculated by the color shift calculator 2502 after reading the color-shift detection pattern is stored in a memory, and it is determined whether to correct the magnification by calculating an amount of relative color shift stored in the memory and an offset amount (value) for each color based on a temperature input from the thermistor 2504, and by adding the offset amount to the magnification correction controller 110. More specifically, the color shift calculator 2502 reads analog data for the temperatures output from the thermistor 2504 by an analog-to-digital converter internally provided. Furthermore, the color shift calculator 2502 determines whether to start the process of calculating the offset amount to be added to the magnification correction controller 110 and addition of the calculated offset amount to the magnification correction controller 110, based on the number of prints input from the printer controller 2503. The color shift calculator 2502 further calculates, by referring to a memory 2501, an amount of color shift based on a correlation between the temperature and the amount of color shift and a correlation between the number of prints and the amount of color shift.

If Y color is the measurement color for performing a time difference, the magnification correction controller 110 corrects a main-scanning magnification by adding, for example, an offset amount obtained based on the amount of color shift calculated by the color shift calculator 2502 and the current temperature to the time difference data of other colors (K color, M color, and C color). The offset amount mentioned here indicates a value obtained by calculation of the magnification correction controller 110 and the write-clock generator circuit 108 using following Equation with respect to a corresponding color (e.g., C color) and by correction such that the data measure for the Y color can be used for the C color.

(time-difference data of reference color [Y color])+
(offset amount for correcting a magnification of C color)

For example, a fixed amount can be used as the offset amount, such as +2 dots for the C color and −1.3 dots for the M color, or a value proportional to the temperature can be used as the offset amount, such as +2 dots C/° C.

Previously recorded in the memory 2501 are the correlation between the atmospheric temperature of the location where the apparatus is installed or the local temperature of the apparatus as environmental data and the amount of color shift, and also the correlation between the number of prints and the amount of color shift as environmental data. This is because there are fixed correlations between the temperature and the length for main-scanning magnification and between the number of prints and the length for main-scanning magnification. The environmental data mentioned here correspond to temperature, humidity (relative humidity and absolute humidity), pressure, vibration, and the number of printings. The polyimide that is often used for the toner and the intermediate transfer body shrinks when the humidity decreases, and therefore, a relation between the humidity and the color shift may be stored in the memory 2501 to store it in the apparatus.

Figure 26:
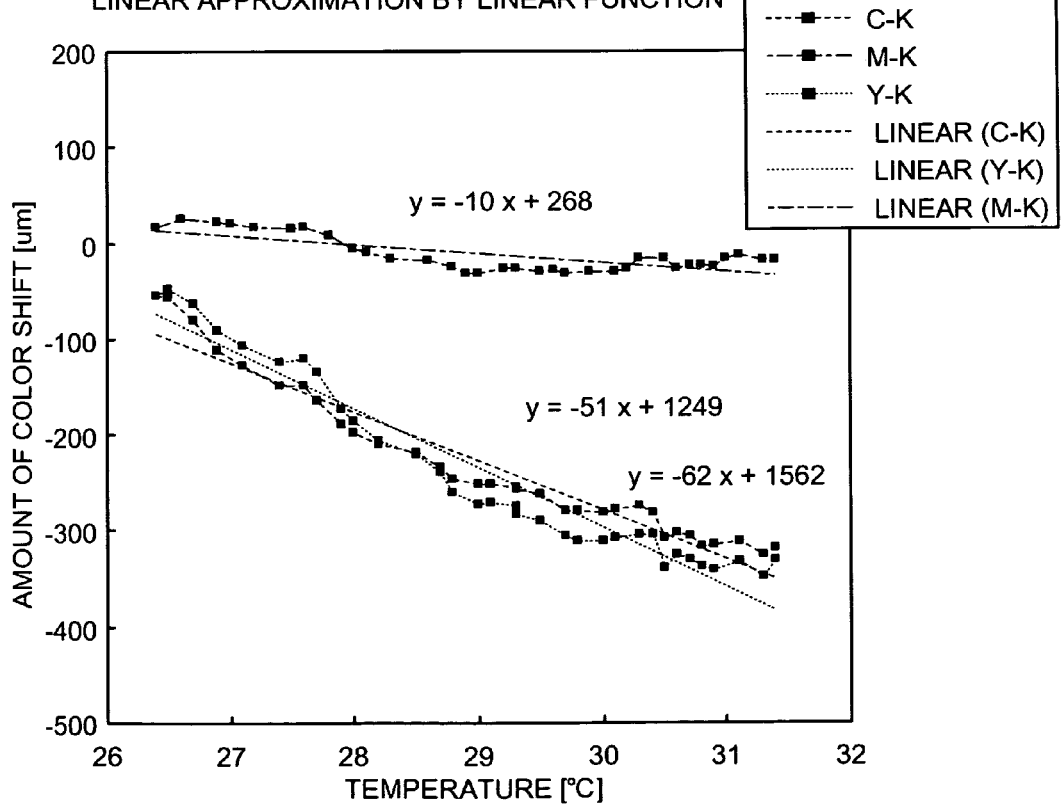
FIG. 26 is a graph in which a plot indicating a correlation between temperature and an amount of color shift is approximated by a linear function.

FIG. 26 is a graph in which a plot indicating a correlation between temperature and an amount of color shift is approximated by a linear function. In FIG. 26, there is shown a relation between the temperature in the writing unit of the image forming apparatus and each amount of color shift of Y, C, and M with respect to K, due to the change in temperature. More specifically, in FIG. 26, each amount of color shift of the colors with respect to K, i.e., C-K, M-K, and Y-K are shown. As shown in FIG. 26, linear approximation (approximation by the linear function) is performed on each set, and it is therefore understood that −10 µm/° C. changes in M-K, −51 µm/° C. in C-K, and −62 µm/° C. in Y-K.

An optical system of the tenth embodiment is a counter-scanning type in which forward scanning is performed in the MK side and backward scanning is performed in the YC side. As for M scanned from the direction the same as that of K, only about 10 µm per 1° C. is shifted, but in Y and C, in which the backward scanning is performed, about 50 µm to 60 µm are shifted. This indicates that the length in the main scanning extends 25 µm to 30 µm per 1° C.

The color shift calculator 2502 reads the data from the memory 2501. The magnification correction controller 110 performs magnification correction in the main scanning on each length of all the colors of K, Y, M, and C in the main scanning, each time when the temperature of the thermistor changes by 1° C., by linearly changing the length (about 5 µm/° C.) obtained from the change amount, to prevent color shift.

As shown in FIG. 26, if the relation between the temperature and the amount of color shift is linearly approximated by a linear expression, the relation between the temperature and the amount of color shift cannot sometimes be expressed accurately like a case of 10 µm/° C. when 15 to 15° C. and a case of 25 µm/° C. when 25 to 35° C. In these cases, the plot indicating the correlation between the temperature and the amount of color shift is only necessary to be approximated by a quadratic function.

Figure 27:
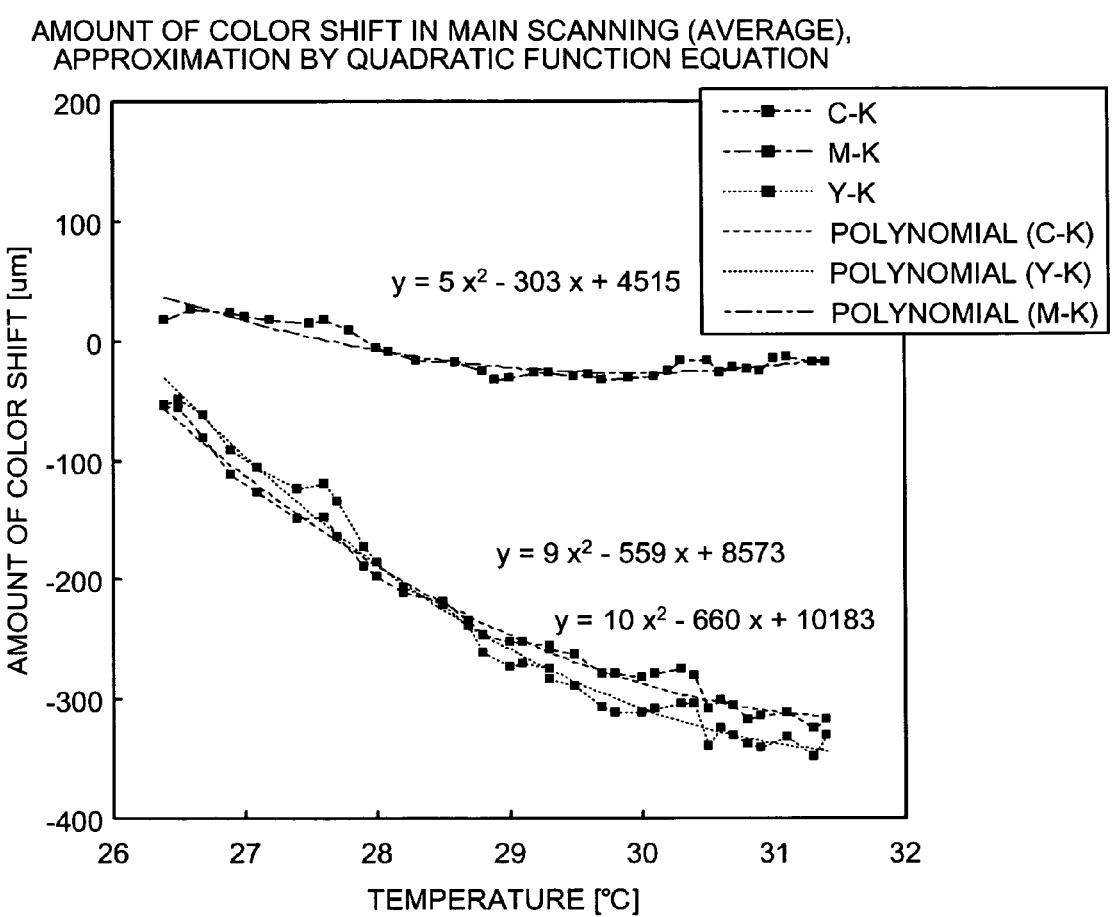
FIG. 27 is a graph in which a plot indicating a correlation between temperature and an amount of color shift is approximated by a quadratic function.

FIG. 27 is a graph in which the plot indicating the correlation between temperature and the amount of color shift is approximated by a quadratic function. As shown in FIG. 27, by approximating the change in data due to temperature by an expression of the quadratic function, it is possible to obtain more accurate correlation as compared with the linear approximation using the linear function.

Similarly to the correlation between the temperature and the amount of color shift, there is also a correlation between the number of prints and the amount of color shift such that the correlation is obtained by being linearly approximated by the linear expression as shown in FIG. 26. Furthermore, there is a correlation between the number of prints and the amount of color shift such that the correlation is obtained by being approximated by the quadratic function as shown in FIG. 27.

Figure 28:
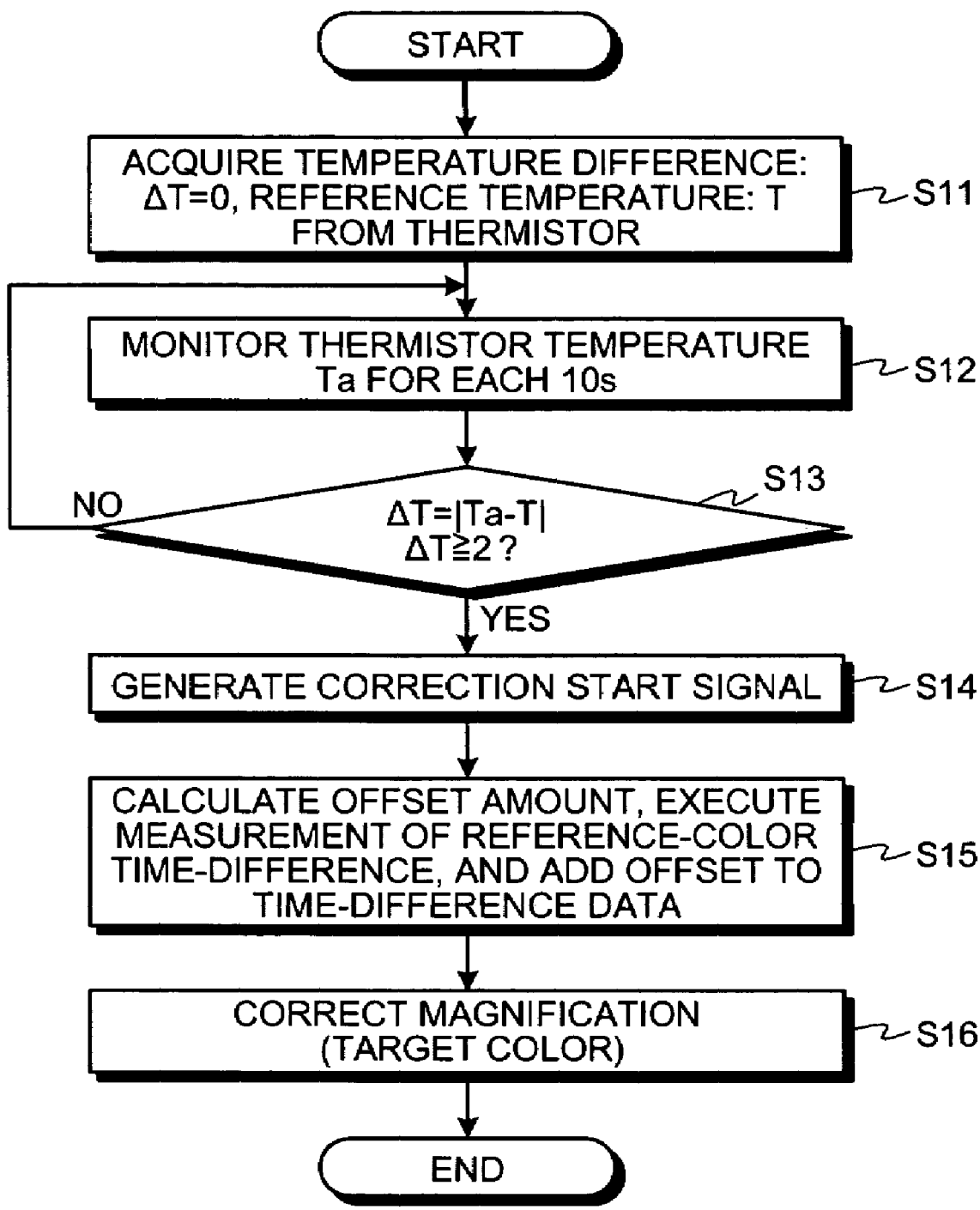
FIG. 28 is a flowchart of a procedure for a magnification correction process based on temperature.

A color-shift correction process by the image forming apparatus according to the tenth embodiment is explained below. FIG. 28 is a flowchart of a procedure for a magnification correction process based on temperature.

At first, a temperature difference ΔT is initialized by zero "0", and a reference temperature T is acquired from the thermistor 2504 (step S11). Then, the thermistor temperature Ta is monitored for each 10 seconds (step S12). It is determined whether an Equation (1) holds (step S13), and ΔT is expressed by an Equation (2).

$$\Delta T \geq 2 \quad (1)$$

$$\Delta T = |Ta - T| \quad (2)$$

If the Equation (1) holds, that is, if the temperature difference ΔT is equal to or more than a predetermined threshold, the process at step S12 is repeated. On the other hand, if the Equation (1) does not hold and the temperature difference ΔT is less than the predetermined threshold, the color shift calculator 2502 generates a correction start signal (step S14). When the correction start signal is generated, the magnification correction controller 110 calculates the offset amount from the color-shift amount stored in the memory, executes measurement of the reference-color time-difference, adds the offset amount to the time-difference data (step S15), and corrects main-scanning magnification, as in the first to the ninth embodiments (step S16). The color-shift amount stored in the memory is obtained by reading the color-shift detection pattern and referring to the relation between the temperature and the amount of color shift in the memory.

Figure 29:
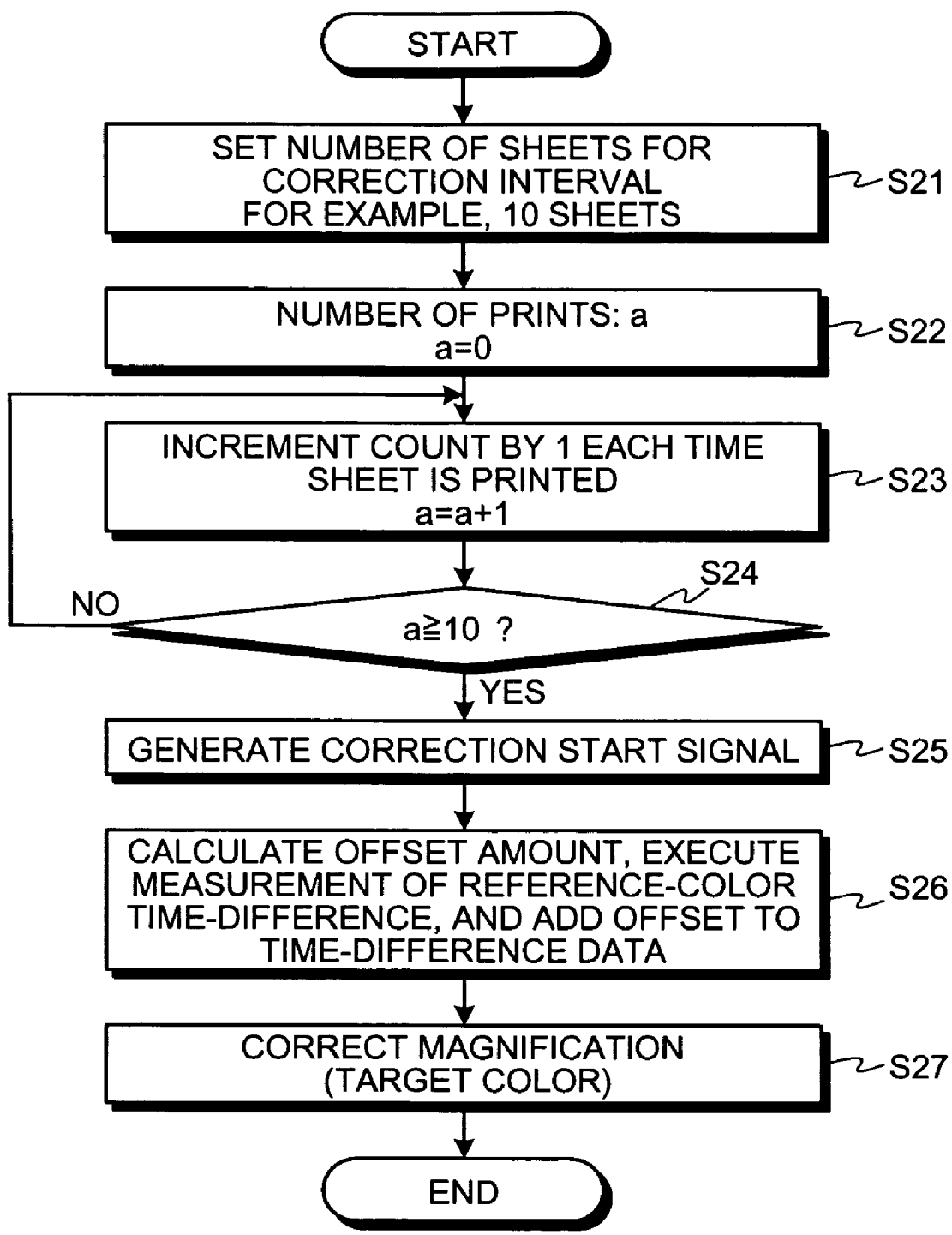
FIG. 29 is a flowchart of a procedure for a magnification correction process based on the number of prints.

FIG. 29 is a flowchart of a procedure for a color-shift correction process based on the number of prints. At first, the number of prints which indicates an interval at which color shift is corrected (number of sheets for a correction interval) is set to, for example, 10 sheets (step S21). Then, the number a of prints is set to 0 as an initial value by the printer controller 2503 (step S22). Next, the count of the number a of prints is incremented by one each time a sheet is printed (step S23).

It is then determined whether the number a of sheets reaches the number of sheets for the correction interval (10 sheets in FIG. 29) set at step S21 (step S24). If the number a of sheets does not reach the number of sheets for the correction interval, the process at step S23 is repeated. On the other hand, if the number a of sheets printed reaches the number of sheets for the correction interval, the color shift calculator 2502 generates a correction start signal (step S25). When the correction start signal is generated, the magnification correction controller 110 calculates the offset amount from the color-shift amount stored in the memory, executes measurement of the reference-color time-difference, adds the offset amount to the time-difference data (step S26), and corrects main-scanning magnification as in the first to the ninth embodiments (step S27). The color-shift amount stored in the memory is obtained by reading the color-shift detection pattern and referring to the relation between the temperature and the amount of color shift stored in the memory.

In this manner, in the image forming apparatus according to the tenth embodiment, the main-scanning magnification is corrected by reading the color-shift detection pattern, determining the amount of color shift by referring to the correlation between the number of prints and the amount of color shift stored in the memory, obtaining an offset amount from the amount of color shift, and adding the offset amount to the time difference data. Therefore, the correction process allows image formation without color shift.

Furthermore, in the image forming apparatus according to the tenth embodiment, the calculation of the amount of color shift and the correction of the main-scanning magnification apply for the image forming apparatuses according to the second, the third, the fourth, and the seventh embodiments each having the magnification correction controller 110 that corrects the main-scanning magnification. The application is performed by changing each timing of image signals corresponding to a specific color and a color different from the specific color based on the data for a time difference measured for the specific color. This allows image formation without color shift while the number of components is reduced and the manufacturing cost is reduced.

Although the four colors are arranged in order of Y, C, K, and M, or Y, C, M, and K in the embodiments, the color arrangement is not limited to the above orders. Furthermore, the laser beam is detected by the optical sensors provided in the leading edge side and the trailing edge side which are outside the effective writing area in the main scanning direction, and the time difference between the two sides is measured. However, the laser beam in the effective writing area in the main scanning direction may be split by a half mirror or the like between the polygon mirror 102 and the fθ lens 103 or between the fθ lens 103 and the photosensitive element 104 of FIG. 2, and the laser beams split may be guided to the optical sensors.

Other effects and modifications can be easily derived by persons skilled in the art. Therefore, a wide range of mode of the present invention is not limited to the specific details and the representative embodiments expressed and described in the above manner. It should be therefore noted that various modifications are possible without departing from the spirit and scope of the total invention defined by the appended claims and equivalent thereto.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus, comprising:
   a laser-beam scanning unit that deflects a plurality of laser beams modulated by image signals corresponding to a plurality of different colors in a main scanning direction, and irradiates the laser beams to a plurality of image carriers corresponding to the different colors, respectively;
   a plurality of developing units that visualize latent images formed on the image carriers by irradiation of the laser beams, respectively;
   a transfer unit that transfers the visualized latent images to a transfer element;
   a first laser beam detector that detects a first detection time in a predetermined position along a main scanning line of an image carrier to which the laser beam is irradiated;
   a plurality of second laser beam detectors that detect a second detection time in a position different from the predetermined position along the main scanning line;
   a time-difference measuring unit that measures a time difference between the first detection time and the second detection time; and
   a magnification correction controller that corrects magnification in the main scanning direction by changing a timing of the image signal based on the measured time difference, wherein
   the first laser beam detector and one second laser beam detector of the plurality of second laser beam detectors are provided near the image carrier corresponding to a predetermined color,
   the magnification correction controller corrects the magnification in the main scanning direction by changing a timing of the image signal corresponding to a color different from the predetermined color, based on the time difference measured for the predetermined color, and
   when an abnormality occurs in one second laser beam detector of the plurality of second laser beam detectors, the time-difference measuring unit measures the time difference using another second laser beam detector of the plurality of the second laser beam detectors that is normal.

2. The image forming apparatus according to claim 1, wherein
   the image carriers are arranged on both sides of the laser-beam scanning unit in two colors for one side and two colors in other side, and the magnification correction controller corrects the magnification in the main scanning direction by changing a timing of the image signal corresponding to one of the two colors on the one side, based on the time difference measured for one of the two colors on the other side.

3. The image forming apparatus according to claim 1, wherein
the image carriers are arranged on both sides of the laser-beam scanning unit in two colors for one side and two colors in other side, and
the first laser beam detector, the second laser beam detector, and the time-difference measuring unit are provided corresponding to the image carrier corresponding to one of four colors.

4. The image forming apparatus according to claim 1, wherein
number of the second laser beam detectors is less than number of the developing units.

5. The image forming apparatus according to claim 1, wherein
the first laser beam detector is arranged on a leading edge side, outside an effective writing area of the image carrier, and
one second laser beam detector is arranged on a trailing edge side, outside the effective writing area of the image carrier.

6. The image forming apparatus according to claim 5, wherein
the first laser beam detector and the second laser beam detector detect lights obtained by splitting the laser beam in the effective writing area of the image carrier.

7. The image forming apparatus according to claim 1, wherein
number of the first laser beam detectors is less than number of the developing units.

8. The image forming apparatus according to claim 1, wherein
a plurality of time-difference measuring units is provided, and
number of the time-difference measuring units is less than number of the developing units.

9. The image forming apparatus according to claim 1, wherein
a plurality of incident laser beams is incident on the first laser beam detector and one second laser beam detector of the plurality of second laser beam detectors.

10. The image forming apparatus according to claim 1, wherein
the time-difference measuring unit measures the time difference using the another second laser beam detector that is normal and a first laser beam detector corresponding to the another second laser beam detector.

11. The image forming apparatus according to claim 1, further comprising:
a sensor that reads a pattern image for detecting a color shift transferred to the transfer element; and
a color shift calculator that calculates an amount of color shift based on a transferred toner image, wherein
the magnification correction controller further corrects the magnification in the main scanning direction by changing a timing of the image signal based on the calculated amount of color shift.

12. The image forming apparatus according to claim 11, wherein the magnification correction controller starts correcting the magnification in the main scanning direction based on the amount of color shift, according to a change in environmental data.

13. The image forming apparatus according to claim 12, wherein
the magnification correction controller corrects the magnification in the main scanning direction by adding an offset amount to the time difference, based on the environmental data.

14. The image forming apparatus according to claim 13, further comprising:
a temperature sensor that detects temperature in the image forming apparatus, as the environmental data, wherein
the magnification correction controller corrects the magnification in the main scanning direction by adding the offset amount to the time difference, based on the detected temperature.

15. The image forming apparatus according to claim 13, further comprising:
a print number counter that counts number of prints, as the environmental data, wherein
the magnification correction controller corrects the magnification in the main scanning direction by adding the offset amount to the time difference, based on the counted number of prints.

16. The image forming apparatus according to claim 13, further comprising:
a temperature sensor that detects temperature in the image forming apparatus, as the environmental data; and
a print number counter that counts number of prints, as the environmental data, wherein
the magnification correction controller corrects the magnification in the main scanning direction by adding the offset amount to the time difference, based on the detected temperature and the counted number of prints.

17. The image forming apparatus according to claim 13, wherein
the offset amount is decided by a linear function.

18. The image forming apparatus according to claim 13, wherein
the offset amount is decided by a quadratic function.

19. The image forming apparatus according to claim 1, wherein
the magnification correction controller includes
a frequency modulator that corrects magnification by changing a timing of writing the image signal; and
a phase modulator that corrects magnification by changing a timing of writing an arbitrary pixel in a unit of equal to or less than a pixel.

20. An image forming method, comprising:
deflecting a plurality of laser beams modulated by image signals corresponding to a plurality of different colors in a main scanning direction;
irradiating the laser beams to a plurality of image carriers corresponding to the different colors, respectively;
visualizing latent images formed on the image carriers by irradiation of the laser beams;
transferring the visualized latent images to a transfer element;
detecting a first detection time with a first laser beam detector in a predetermined position along a main scanning line of the image carrier to which the laser beam is irradiated;

detecting a second detection time with one of a plurality of second laser beam detectors in a position different from the predetermined position along the main scanning line;

determining whether an abnormality has occurred in said one of the plurality of second laser beam detectors;

using another of the plurality of second laser beam detectors to detect the second detection time in the position different from the predetermined position along the main scanning line when the determining step determines that the abnormality has occurred;

measuring a time difference between the first detection time and the second detection time; and correcting magnification in the main scanning direction by changing a timing of the image signal based on the measured time difference, wherein the correcting includes correcting the magnification in the main scanning direction by changing the timing of the image signal corresponding to a color different from a predetermined color, based on the time difference measured for the predetermined color.

* * * * *